US012732822B2

(12) United States Patent
Allan et al.

(10) Patent No.: US 12,732,822 B2
(45) Date of Patent: Sep. 8, 2026

(54) EMERGENCY NOTIFICATION, ACTIVITY NOTIFICATION, AND SUSPICIOUS MOVEMENT DETECTION FOR MOBILE DEVICES

(71) Applicant: DISH Wireless L.L.C., Englewood, CO (US)

(72) Inventors: Andrew Allan, Littleton, CO (US); Michael Aristo Leonard, II, Alexandria, VA (US)

(73) Assignee: DISH Wireless L.L.C., Englewood, CO (US)

( * ) Notice: Subject to any disclaimer, the term of this patent is extended or adjusted under 35 U.S.C. 154(b) by 280 days.

(21) Appl. No.: 18/392,839

(22) Filed: Dec. 21, 2023

(65) Prior Publication Data

US 2025/0211996 A1 Jun. 26, 2025

(51) Int. Cl.

*H04W 12/63* (2021.01)
*H04W 4/02* (2018.01)
*H04W 4/12* (2009.01)

(52) U.S. Cl.

CPC .......... *H04W 12/63* (2021.01); *H04W 4/027* (2013.01); *H04W 4/12* (2013.01)

(58) Field of Classification Search

None

See application file for complete search history.

(56) References Cited

U.S. PATENT DOCUMENTS

| | | | | |
|---|---|---|---|---|
| 8,249,549 | B1 | 8/2012 | Rahman et al. | |
| 11,109,213 | B2 | 8/2021 | Richardson et al. | |
| 12,020,548 | B2 | 6/2024 | Jafri et al. | |
| 2012/0087482 | A1 | 4/2012 | Alexander, Sr. | |
| 2012/0105203 | A1 | 5/2012 | Elliot et al. | |
| 2014/0082099 | A1 * | 3/2014 | Burns | H04L 67/55 709/206 |
| 2015/0074802 | A1 | 3/2015 | Sanjeev et al. | |
| 2022/0415177 | A1 * | 12/2022 | Pusuluri | G08G 1/096716 |
| 2023/0164180 | A1 | 5/2023 | Singh et al. | |
| 2023/0300253 | A1 | 9/2023 | Nagarajan et al. | |
| 2023/0328496 | A1 | 10/2023 | Dizengof et al. | |

* cited by examiner

*Primary Examiner* — Frantz Bataille

(74) *Attorney, Agent, or Firm* — Jeremiah J. Baunach; Frontier IP Law PLLC

(57) ABSTRACT

Foreign emergency notification, activity notification, and suspicious movement detection for mobile devices are disclosed. An application running on a mobile device of a user may be used to automatically detect when a call is made to emergency services in a foreign country, when an issue or unpermitted behavior may be occurring, when the mobile device has moved to an anomalous or unpermitted location and/or is moving with an unexpected speed, etc. The application then notifies family members and/or other contacts in the user's home country via a domestic carrier network. An over-the-top Internet Protocol (IP) message can be sent by the application on the mobile device back to the home network core.

20 Claims, 17 Drawing Sheets

100
Telecom
Internet
170
132
Home Network Infrastructure
122
142
152
LAN
Domestic ISP Infrastructure
172
176
174
130
112
Foreign Roaming Carrier Network Infrastructure
Internet
110
120
160
140
150
LAN
Foreign ISP Infrastructure 200
210
Home Network Site
240
242
222
AI
AI
AI
AI
220
230
260
250
Internet
LLM
LLM
LLM
LLM
262
270
292
290
294
AI
Foreign Roaming Carrier Network Infrastructure
280

FIG. 13
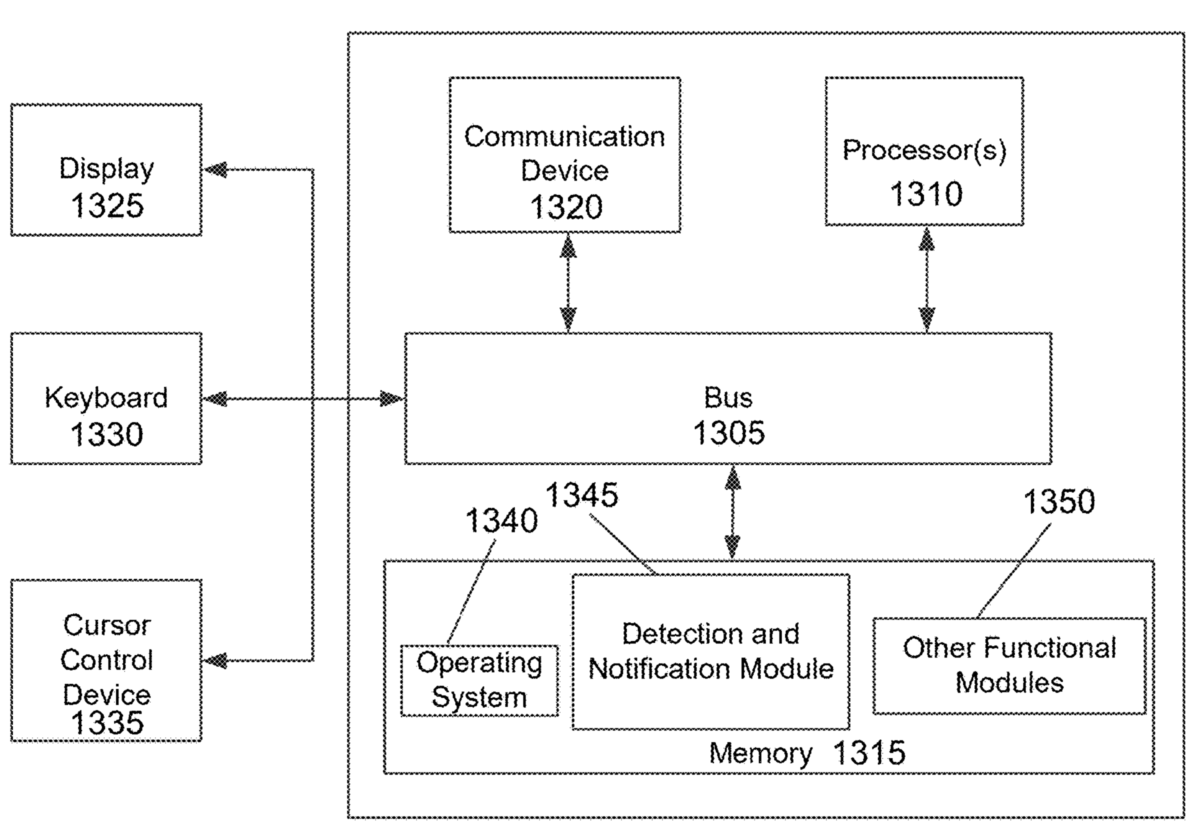
1300
Display
1325
Keyboard
1330
Cursor
Control
Device
1335
Communication
Device
1320
Processor(s)
1310
Bus
1305
1340
1345
1350
Operating
System
Detection and
Notification Module
Other Functional
Modules
Memory 1315

1400
START
Mobile Device Places Foreign Emergency Call
1410
Detect Emergency Call via Packet Sniffing
1420
Send Emergency Message to Home Carrier Network
1430
Receive Emergency Message at Home Carrier Network
1440
Lookup Emergency Contact(s)
1450
Notify Emergency Contact(s)
1460
Take Further Notification Actions
1470
Periodically or Continuously Obtain and Send Further Information
1480
END 1600
START
Monitor Mobile Device Location and/or Speed
1610
Detect Anomalous or Unpermitted Location or Unexpected Speed
1620
Send Message to Home Carrier Network
1630
Receive Message at Home Carrier Network
1640
Lookup Contact(s)
1650
Notify Contact(s)
1660
Take Further Notification Actions
1670
Periodically or Continuously Obtain and Send Further Information
1680
END

EMERGENCY NOTIFICATION, ACTIVITY NOTIFICATION, AND SUSPICIOUS MOVEMENT DETECTION FOR MOBILE DEVICES

FIELD

The present invention generally relates to communications, and more specifically, to foreign emergency notification, activity notification, and suspicious movement detection for mobile devices.

BACKGROUND

Currently, when an individual is traveling abroad and calls an emergency service, such as 911 in the United States, Canada, and Mexico or 112 in many European, Asian, and African nations, the individual is typically roaming on a different carrier than the individual uses in his or her home country. However, family members or other designated individuals in the home country are not notified when an emergency call is made in the foreign country.

SUMMARY

Certain embodiments of the present invention may provide solutions to the problems and needs in the art that have not yet been fully identified, appreciated, or solved by current communications technologies, and/or provide a useful alternative thereto. For example, some embodiments of the present invention pertain to foreign emergency notification, activity notification, and suspicious movement detection for mobile devices.

In an embodiment, one or more computing systems of a carrier network include memory storing computer program instructions for performing foreign emergency notification and at least one processor configured to execute the computer program instructions. The computer program instructions are configured to cause the at least one processor to receive a message from an application running on a mobile device located in a foreign country that automatically detected that a foreign emergency number was called or texted by the mobile device by analyzing one or more packets sent to a foreign carrier network or a foreign Internet Service Provider (ISP) by the mobile device. The computer program instructions are also configured to cause the at least one processor to determine from the communication that a user of the mobile device is experiencing an emergency based on the received message. The computer program instructions are further configured to cause the at least one processor to perform a lookup of one or more emergency notification contacts for the user of the mobile device and send one or more emergency notifications to respective mobile devices of the one or more emergency notification contacts indicating that the emergency is occurring.

In another embodiment, one or more non-transitory computer-readable media store one or more computer programs for performing foreign emergency notification. The one or more computer programs are configured to cause at least one processor to receive a message from an application running on a mobile device located in a foreign country that automatically detected that a foreign emergency number was called or texted by the mobile device by analyzing one or more packets sent to a foreign carrier network or a foreign ISP by the mobile device. The one or more computer programs are configured to cause the at least one processor to, responsive to the message, perform a lookup of one or more emergency notification contacts for the user of the mobile device and send one or more emergency notifications to respective mobile devices of the one or more emergency notification contacts indicating that the emergency is occurring.

In yet another embodiment, a computer-implemented method for performing foreign emergency notification includes receiving, by a computing system of a home carrier network, a message from an application running on a mobile device located in a foreign country that automatically detected that a foreign emergency number was called or texted by the mobile device by analyzing one or more packets sent to a foreign carrier network or a foreign ISP by the mobile device. The computer-implemented method also includes, responsive to the message, performing a lookup of one or more emergency notification contacts for the user of the mobile device, by the computing system of the home carrier network. The computer-implemented method further includes sending, by the computing system of the home carrier network, one or more emergency notifications to respective mobile devices of the one or more emergency notification contacts indicating that the emergency is occurring. The one or more emergency notifications are sent with a sufficiently high priority that the one or more emergency notifications are not dropped by one or more carrier networks and/or one or more ISPs serving the respective mobile devices of the one or more emergency notification contacts due to congestion.

In still another embodiment, one or more computing systems include memory storing computer program instructions and at least one processor configured to execute the computer program instructions. The computer program instructions are configured to cause the at least one processor to monitor text messages sent and/or received by a mobile device, audio recorded by a microphone of the mobile device, or both. The computer program instructions are also configured to cause the at least one processor to provide the text messages and/or recorded audio to one or more artificial intelligence (AI)/machine learning (ML) models as input and receive and analyze output from the one or more AI/ML models. The computer program instructions are further configured to cause the at least one processor to detect, based on the analysis, that a user of the mobile device is potentially experiencing an issue or is engaged in unpermitted behavior. Additionally, the computer program instructions are configured to cause the at least one processor to send a message pertaining to the potential issue or the unpermitted behavior via a roaming network or an ISP to a home network core.

In another embodiment, one or more non-transitory computer-readable media store computer program instructions. The computer program instructions are configured to cause at least one processor to monitor text messages sent and/or received by a mobile device, audio recorded by a microphone of the mobile device, or both. The computer program instructions are also configured to cause the at least one processor to provide the text messages and/or recorded audio to one or more artificial intelligence AI/ML models as input and receive and analyze output from the one or more AI/ML models. The computer program instructions are further configured to cause the at least one processor to detect, based on the analysis, that a user of the mobile device is potentially experiencing an issue or is engaged in unpermitted behavior. Additionally, the computer program instructions are configured to cause the at least one processor to send a message pertaining to the potential issue or the unpermitted behavior via a roaming network or an ISP to a home network core. At least one of the one or more AI/ML models is trained to determine from a tone of a voice in the recorded audio, a volume and patterns of speech in the recorded audio, content of the speech in the recorded audio, or any combination thereof, that the user of the mobile device is potentially experiencing the issue or is engaged in the unpermitted behavior.

In yet another embodiment, a mobile device includes memory storing computer program instructions for an emergency monitoring application and at least one processor configured to execute the computer program instructions. The computer program instructions are configured to cause the at least one processor to monitor text messages sent and/or received by a mobile device, audio recorded by a microphone of the mobile device, or both. The computer program instructions are also configured to cause the at least one processor to provide the text messages and/or recorded audio to one or more AI/ML models as input and receive and analyze output from the one or more AI/ML models. The computer program instructions are further configured to cause the at least one processor to detect, based on the analysis, that a user of the mobile device is potentially experiencing an issue or is engaged in unpermitted behavior. Additionally, the computer program instructions are configured to cause the at least one processor to send a message pertaining to the potential issue or the unpermitted behavior via a roaming network or an ISP to a home network core. At least one of the one or more AI/ML models is trained to determine from a tone of a voice in the recorded audio, a volume and patterns of speech in the recorded audio, content of the speech in the recorded audio, or any combination thereof, that the user of the mobile device is potentially experiencing the issue or is engaged in the unpermitted behavior. The message is sent with a sufficiently high priority that packets associated with the message are not dropped by the roaming network, the home network core, and/or the ISP due to congestion.

In still another embodiment, one or more computing systems include memory storing computer program instructions and at least one processor configured to execute the computer program instructions. The computer program instructions are configured to cause the at least one processor to monitor a location, an acceleration, and/or a speed of a mobile device. The computer program instructions are also configured to cause the at least one processor to provide information pertaining to the location, the acceleration, and/or the speed of the mobile device to one or more AI/ML models as input and receive and analyze output from the one or more AI/ML models. The computer program instructions are further configured to cause the at least one processor to detect, based on the analysis, that the location and/or movement of the mobile device is anomalous. Additionally, the computer program instructions are configured to cause the at least one processor to send a message pertaining to the anomalous location and/or movement of the mobile device via a roaming network or an ISP to a home network core.

In another embodiment, one or more non-transitory computer-readable media store computer program instructions. The computer program instructions are configured to cause at least one processor to monitor a location, an acceleration, and/or a speed of a mobile device. The computer program instructions are also configured to cause the at least one processor to provide information pertaining to the location, the acceleration, and/or the speed of the mobile device to one or more AI/ML models as input and receive and analyze output from the one or more AI/ML models. The computer program instructions are further configured to cause the at least one processor to detect, based on the analysis, that the location and/or movement of the mobile device is anomalous. Additionally, the computer program instructions are configured to cause the at least one processor to send a message pertaining to the anomalous location and/or movement of the mobile device via a roaming network or an ISP to a home network core. At least one of the one or more AI/ML models is trained to determine speeds, locations, and/or accelerations that are anomalous based on training data and provide the output based on the determination.

In yet another embodiment, a mobile device includes memory storing computer program instructions and at least one processor configured to execute the computer program instructions. The computer program instructions are configured to cause the at least one processor to monitor text messages sent and/or received by a mobile device, audio recorded by a microphone of the mobile device, or both. The computer program instructions are also configured to cause the at least one processor to provide the text messages and/or recorded audio to one or more AI/ML models as input and receive and analyze output from the one or more AI/ML models. The computer program instructions are further configured to cause the at least one processor to detect, based on the analysis, that a user of the mobile device is potentially experiencing an issue or is engaged in unpermitted behavior. Additionally, the computer program instructions are configured to cause the at least one processor to send a message pertaining to the potential issue or the unpermitted behavior via a roaming network or an ISP to a home network core. At least one of the one or more AI/ML models is trained to determine speeds, locations, and/or accelerations that are anomalous based on training data and provide the output based on the determination. The message is sent with a sufficiently high priority that packets associated with the message are not dropped by the roaming network, the home network core, and/or the ISP due to congestion.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 13 is an architectural diagram illustrating a computing system configured to perform operations for foreign emergency notification, activity notification, and/or suspicious movement detection for mobile devices, according to an embodiment of the present invention.

Unless otherwise indicated, similar reference characters denote corresponding features consistently throughout the attached drawings.

DETAILED DESCRIPTION OF THE EMBODIMENTS

Figure 1:
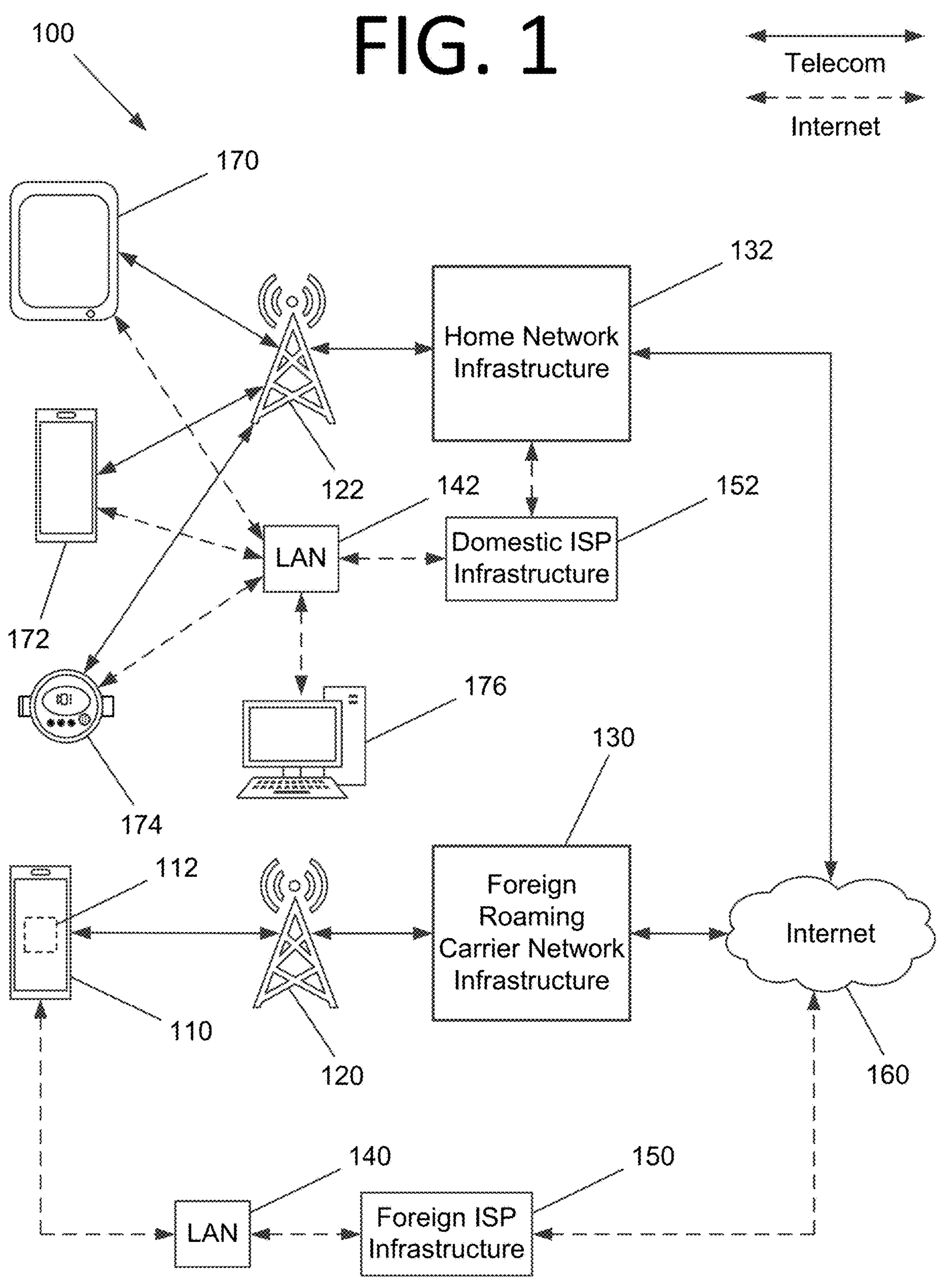
FIG. 1 is an architectural diagram illustrating a telecommunications system configured to perform foreign emergency notification, activity notification, and suspicious movement detection for mobile devices, according to an embodiment of the present invention.

Some embodiments pertain to foreign emergency notification, activity notification, and suspicious movement detection for mobile devices. An application running on a mobile device may be used to automatically detect when a call is made to emergency services in a foreign country and notify family members and/or other contacts in the user's home country. An Over-the-Top (OTT) Internet Protocol (IP) message can be sent by the application on the mobile device back to the home network core. This avoids roaming agreements and the like.

Traditional telecommunications services include voice calls and text messages (i.e., Short Message Service (SMS)). OTT messages, however, are sent using data or the Internet Protocol (IP) of the cellular provider/Wireless Local Area Network (WLAN) rather than using traditional SMS infrastructure. OTT messages still require use of the cellular provider's core when sent via cellular, whether a home network core, a roaming network core, or both.

OTT applications not only handle voice calls and text messages, but also video calls, group communications, smart messaging, free international calls, etc. Typically, OTT client applications communicate through an OTT server. Each leg in the communications chain has secure connectivity to the OTT server that connects to the OTT subscribers. There are various OTT applications that subscribers can pick and use depending on the desired features, such as WhatsApp®, Telegram®, Signal®, etc.

The application may include a packet sniffer that analyzes packets for voice and/or SMS communications, looking at packet header and/or packet payload information. For instance, the packet sniffer may look for an emergency (SOS) Primary Director Number (PDN), such as 911, 112, etc., that tells the network that there is an emergency call. As data streams flow outbound from the mobile device, the packet analyzer captures each packet and, if needed, decodes the raw data of the packet, showing the values of various fields in the packet. The packet sniffer then analyzes the packet content according to the appropriate specifications.

After an emergency call is detected, the application on the mobile device may send message(s) via text or IP (e.g., via WhatsApp®, Signal®, Facebook Messenger®, etc.) alerting the authorized individual(s) that the call was made. In some embodiments, the application may decode voice payload information from the packets associated with the emergency call or record the voice audio itself and send the text thereof to the authorized individual(s). If audio was recorded, the audio may be provided to the authorized individual(s) in a voice call from the home mobile network operator (MNO) or mobile virtual network operator (MVNO). Routing information in the headers of the voice, text, or data packets that are being sent to the authorized individual(s) may have a high priority so they are not dropped if the roaming network or Internet Service Provider (ISP) network is slow.

Quality of Service (QOS) is the ability to provide differentiated packet forwarding treatment of data that may belong to different users, different applications, different services, different media within the same application (e.g., voice, text, and video), etc. The differentiated treatment may be to prioritize between the data and/or to guarantee a certain level of performance for a data flow. QoS Class Identifiers (QCIs) identify certain characteristics (e.g., whether Guaranteed Bit Rate (GBR) or non-GBR, the priority level, the packet delay budget, the packet error loss rate, etc.). This may be according to a standardized table in Third Generation Partnership Project (3GPP) Technical Specification (TS) 23.203 or based on an operator configuration in the Public Land Mobile Network (PLMN).

In the control packets used to determine the priority of the shared packets (i.e., the packets used to send the message), the QoS Class Identifier (QCI) should be made to the highest priority available for each particular service to ensure that the messages are sent as high priority to the devices of the emergency contact(s). Per 3GPP TS 23.203, for a voice call, the QCI should be set to 1. For SMS, the QCI should be set to 5. For IP voice calls or messages, the QCI should be set to 6.

In some cases, an individual in distress may choose not to call emergency services, such as if the individual is afraid that an attacker or kidnapper will harm the individual responsive to making the call or the individual feels the need to be silent. Alternatively, the individual may be doing something that he or she does not want authorized individuals to be aware of, an individual using the mobile device may have stolen it, etc. Some embodiments may attempt to address these issues by analyzing typed text and/or text obtained from audio via speech-to-text using an artificial intelligence (AI)/machine learning (ML) model. In some embodiments, the AI/ML model may be a generative AI model. In some embodiments, a computer vision (CV) model may be used on photos stored on the mobile device to try to recognize faces, objects associated with various locations, etc.

The AI/ML model may be trained to determine text that includes signs of distress or inappropriate behavior. A large language model (LLM) may be particularly useful for such purposes since the LLM can be focused to be adept at this particular use case in the fine-tuning phase of its training. The AI/ML model may be part of the application on the mobile device or otherwise stored on the mobile device and accessible by the application. Alternatively, and particularly if processing resource-intensive, the AI/ML model may be located remotely (e.g., hosted by the home MNO or MVNO) and accessed by the application via the roaming network or an Internet connection, if available.

Recording telephone conversations may run afoul of certain privacy laws, such as the General Data Protection Regulation (GDPR) in Europe, certain state laws in the United States, etc. Accordingly, rather than analyzing incoming voice packets, some embodiments may take input from the caller and nothing else. For instance, speech data detected from the microphone of the mobile device may be provided to the application. From there, the speech may be translated by a speech-to-text model (locally or remotely), and the text therefrom may be provided to an AI/ML model to analyze whether the content of the speech indicates an issue.

In some embodiments, an application on the mobile device (either the same application as that discussed above or a different application) could use location information to determine whether the location and/or movement of the mobile device is indicative of unauthorized activity, or even a crime. Consider the scenario where a teenage child travels to Rome, Italy on a high school trip. However, the application detects that the mobile device moving quickly (e.g., at speeds of a car or a train) and/or the location of the mobile device is beyond a certain distance from where the child is supposed to be (e.g., the mobile device has moved to Milan, is now in Greece instead of Italy, etc.). This may be indicative of the child choosing to go where he or she is not permitted to, that the mobile device has been stolen, or worse, that the child has been kidnapped. The application may send an alert to authorized individuals letting them know that this is the case. The application may also contact local police proximate to the mobile device's location, interpret based on the location that the mobile device is on a train and provide authorities with the train schedule, provide speech recorded by the mobile device, turn on the microphone via the application to continue recording speech even though a call is not being made, etc.

In some embodiments, secondary alert conditions based on primary calling conditions may be used. In other words, different types of emergency calls may have different notification settings. For instance, emergency calls to the local police may lead to notification of federal or international police agencies in addition to authorized users.

FIG. 1 is an architectural diagram illustrating a telecommunications system 100 configured to perform foreign emergency notification, activity notification, and suspicious movement detection for mobile devices, according to an embodiment of the present invention. System 100 includes a mobile device 110 that is located in a foreign country and roaming on a foreign carrier network. In some countries, the foreign carrier network may be 3G or even 2G if 4G, 4G LTE, and/or 5G is not available. Mobile device 110 communicates with foreign carrier roaming network infrastructure 130 via a Radio Access Network (RAN) 120. If available, mobile device 110 may communicate with the Internet 160 via Local Area Network (LAN) 140 (e.g., a WLAN) and foreign ISP infrastructure 150. In some cases, such as if cell service is not available and/or the user puts mobile device 110 in airplane mode to avoid foreign roaming fees, mobile device 110 may communicate through the Internet 160 via LAN 140 and foreign ISP infrastructure 150 alone.

Mobile device 110 is running an application 112 that performs packet sniffing and/or otherwise monitors outgoing voice, SMS, and/or OTT data communications. When application 112 detects that there may be an issue, such as when the user dials an emergency service number, the mobile device is moving above a certain speed and/or more than a permitted distance from a previous location of mobile device 110, mobile device 110 is turned on in a location that is not expected or not permitted, speech or text is detected that indicates that an issue may be occurring, etc., application 112 sends or causes sending (e.g., via another application) of information pertaining to the issue by sending OTT messages through the foreign roaming carrier network infrastructure 130 and/or Transmission Control Protocol/Internet Protocol (TCP/IP) messages via foreign ISP infrastructure 150 and Internet 160 to home network infrastructure 132 (e.g., servers or other computing systems of the network core thereof). In some embodiments, dedicated server(s) may be specifically tasked with providing alerting functionality for authorized users.

Home network infrastructure 132 then sends communications to computing systems of authorized individual(s) via RAN 122 and/or domestic ISP infrastructure 152 and LAN 142 (e.g., a WLAN). For instance, in this embodiment, a tablet 170, mobile device 172, smart watch 174, and personal computer (PC) 176 are notified. The medium of the communications may include, but is not limited to, an SMS message, a voice call, a voicemail message, a message in a third party application running on the respective computing system, an email, any combination thereof, etc. Depending on the severity of the potential issue, home network infrastructure may notify the Federal Bureau of Investigation (FBI), the International Criminal Police Organization (INTERPOL), local police in the foreign country, the home country embassy of the user of mobile device 110 in the foreign country, any combination thereof, etc.

Per the above, AI/ML may be used to augment the capabilities of the foreign emergency notification, activity notification, and suspicious movement detection. AI/ML model(s) may be hosted locally on mobile device 110, on computing systems of home network infrastructure 132, on third party systems accessible by home network infrastructure 132 and/or mobile device 110, or any combination thereof. The AI/ML model(s) may include speech-to-text models, CV models, optical character recognition (OCR) models, generative AI models, etc.

Figure 2:
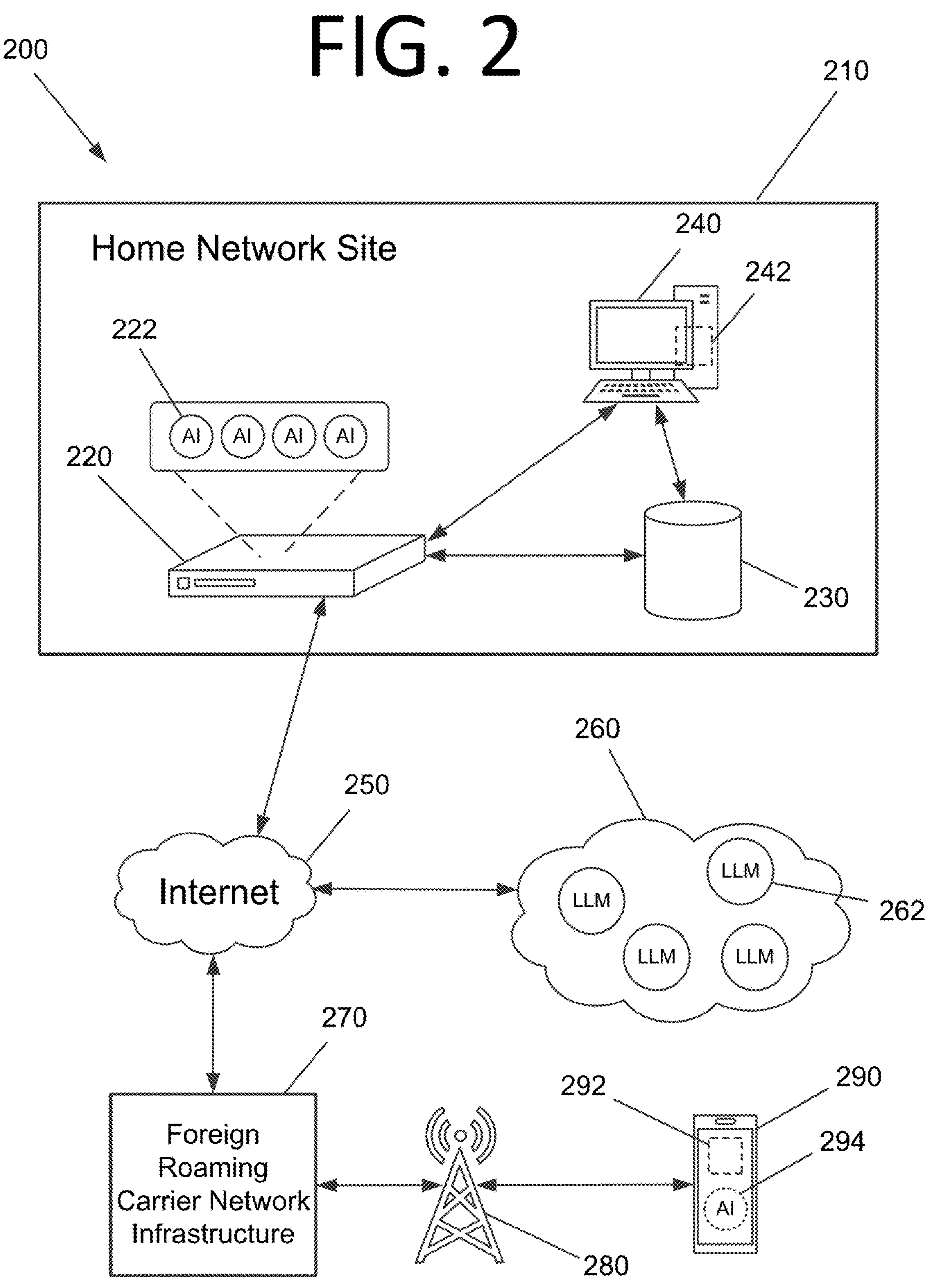
FIG. 2 is an architectural diagram illustrating a home network artificial intelligence (AI)/machine learning (ML) system, according to an embodiment of the present invention.

FIG. 2 is an architectural diagram illustrating a home network AI/ML system 200, according to an embodiment of the present invention. Home network system 200 includes a home network site, such as a national data center (NDC), a regional data center (RDC), a breakout edge data center (BEDC), a Performance Edge Data Center (PEDC), another site housing computing systems or accessing such systems via the cloud, etc. In some embodiments, home network site 210 may be part of home network infrastructure 132 of FIG. 1. It should also be noted that while foreign alerting scenarios are shown in FIGS. 1 and 2, in some embodiments, the functionality may occur domestically, and potentially be detected for mobile devices operating on the home carrier's own network.

Home network site 210 includes a server 220 running AI/ML models 222. However, in some embodiments, the AI/ML models may be stored in a database accessible by server 220, such as database 230. While one server 220 is shown for illustration purposes, multiple or many servers that are proximate to one another or in a distributed architecture may be employed to provide this functionality without deviating from the scope of the invention. In some embodiments, home network site 210 may incorporate or be part of a public cloud architecture, a private cloud architecture, a hybrid cloud architecture, etc. In certain embodiments, home network site 210 may host multiple software-based servers on one or more computing systems, such as server 220. In some embodiments, one or more servers of home network site 210, such as server 220, may be implemented via one or more virtual machines (VMs), in containers, etc.

AI/ML models 222 are trained to accomplish various tasks. For instance, AI/ML models 222 may include models trained to perform speech-to-text translation, CV, OCR, context and semantic association, recognize patterns in text that may be indicative of an issue, recognize patterns in audio recordings that may indicate that a person is in distress, learn travel patterns of a mobile device and determine deviations therefrom, perform analytical predictions, perform sequence extraction, perform clustering detection, any combination thereof etc. AI/ML models may be trained using labeled and/or unlabeled training data, such as from corpuses of text, samples of audio recordings, lists of device locations and times, images of faces, objects, buildings, scenery, and/or other elements in the images, inertial measurement unit (IMU) data from mobile devices including acceleration patterns that may be indicative of problems, etc. AI/ML models 222 may be trained to achieve a desired confidence threshold while not being overfit to a given set of training data. AI/ML models 222 may be trained for any suitable purpose without deviating from the scope of the invention.

Two or more of AI/ML models 222 may be chained in some embodiments (e.g., in series, in parallel, or a combination thereof) such that they collectively provide collaborative output(s). Using multiple AI/ML models may allow development of a more comprehensive picture of what is happening to a user of a mobile device, for example. Patterns may be determined individually by an AI/ML model or collectively by multiple AI/ML models. In certain embodiments, one or more AI/ML models are deployed locally on the mobile device, such as AI/ML model 294 of mobile device 290. Each AI/ML model 222 is an algorithm that runs on the data, and the AI/ML model itself may be a deep learning neural network (DLNN) of trained artificial "neurons" that are trained on training data, for example. In some embodiments, AI/ML models 222 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

In order to train AI/ML models 222, training data (labeled, unlabeled, or both) may be stored in database 230 or another database and provided by a training data application 242 of a training computing system 240 that can label training data. However, in some embodiments, some or all of the training data may not be labeled. AI/ML models 222 may be initially trained using this training data, and as new training data is available over time, one or more of AI/ML models 222 may be replaced with newly trained AI/ML models or be retrained to increase accuracy. Retraining may be performed in response to detecting data and/or model drift in some embodiments.

In some embodiments, generative AI models are used. Generative AI can generate various types of content, such as text, imagery, audio, and synthetic data. Various types of generative AI models may be used, including, but not limited to, LLMs, generative adversarial networks (GANs), variational autoencoders (VAEs), transformers, etc. These models may be part of AI/ML models 222 hosted on server 220 in some embodiments. For instance, the generative AI models may be trained on a large corpus of textual information to perform semantic understanding, to understand the nature of what is happening in text from a mobile device of a user, and the like. In certain embodiments, generative AI models 262 provided by an existing cloud ML service provider system 260, such as OpenAIR, Google®, Amazon®, Microsoft®, IBM®, Nvidia®, Facebook®, etc., may be employed and trained to provide such functionality. Generative AI models 262 may be accessed by server 220 via the Internet. In generative AI embodiments where generative AI model(s) 262 are remotely hosted, server 220 can be configured to integrate with third-party APIs, which allow server 220 to send a request to generative AI model(s) 262 including the requisite input information and receive a response in return. Such embodiments may provide a more advanced and sophisticated user experience, as well as provide access to state-of-the-art natural language processing (NLP) and other ML capabilities that these companies offer.

One aspect of generative AI models in some embodiments is the use of transfer learning. In transfer learning, a pretrained generative AI mode, such as an LLM, is fine-tuned on a specific task or domain. This allows the LLM to leverage the knowledge already learned during its initial training and adapt it to a specific application. In the case of LLMs, the pretraining phase involves training an LLM on a large corpus of text, typically consisting of billions of words. During this phase, the LLM learns the relationships between words and phrases, which enables the LLM to generate coherent and human-like responses to text-based inputs. The output of this pretraining phase is an LLM that has a high level of understanding of the underlying patterns in natural language.

In the fine-tuning phase, the pretrained LLM is adapted to a specific task or domain by training the LLM on a smaller dataset that is specific to the task. For instance, in some embodiments, the LLM may be trained to analyze a certain type or multiple types of data sources to improve its accuracy with respect to their content. Such information may be provided as part of the training data, and the LLM may learn to focus on these areas and more accurately identify data elements therein. Fine-tuning allows the LLM to learn the nuances of the task or domain, such as the specific vocabulary and syntax used in that domain, without requiring as much data as would be necessary to train an LLM from scratch. By leveraging the knowledge learned in the pretraining phase, the fine-tuned LLM can achieve state-of-the-art performance on specific tasks with a relatively small amount of training data.

LLMs may be trained using a vector database in some embodiments. Vector databases index, store, and provide access to structured or unstructured data (e.g., text, images, time series data, etc.) alongside the vector embeddings thereof. Data such as text may be tokenized, where single letters, words, or sequences of words are parsed from the text into tokens. These tokens are then "embedded" into the vector embeddings, which are the numerical representations of this data. Vector databases allow software to find and retrieve similar objects quickly and at scale in production environments.

AI and ML allow unstructured data to be numerically represented without losing the semantic meaning thereof in vector embeddings. A vector embedding is a long list of numbers, each describing a feature of the data object that the vector embedding represents. Similar objects are grouped together in the vector space. In other words, the more similar the objects are, the closer that the vector embeddings representing the objects will be to one another. Similar objects may be found using a vector search, similarity search, or semantic search. The distance between the vector embeddings may be calculated using various techniques including, but not limited to, squared Euclidean or L2-squared distance, Manhattan or L1 distance, cosine similarity, dot product, Hamming distance, etc. It may be beneficial to select the same metric that is used to train the AI/ML model.

Vector indexing may be used to organize vector embeddings so data can be retrieved efficiently. Calculating the distance between a vector embedding and all other vector embeddings in the vector database using the k-Nearest Neighbors (kNN) algorithm can be computationally expensive if there are a large number of data points since the required calculations increase linearly (i.e., O(n)) with the dimensionality and the number of data points. It is more efficient to find similar objects using an approximate nearest neighbor (ANN) approach. The distances between the vector embeddings are pre-calculated, and similar vectors are organized and stored close to one another (e.g., in clusters or a graph) similar objects can be found faster. This process is called "vector indexing." ANN algorithms that may be used in some embodiments include, but are not limited to, clustering-based indexing, proximity graph-based indexing, tree-based indexing, hash-based indexing, compression-based indexing, etc.

Figure 3:
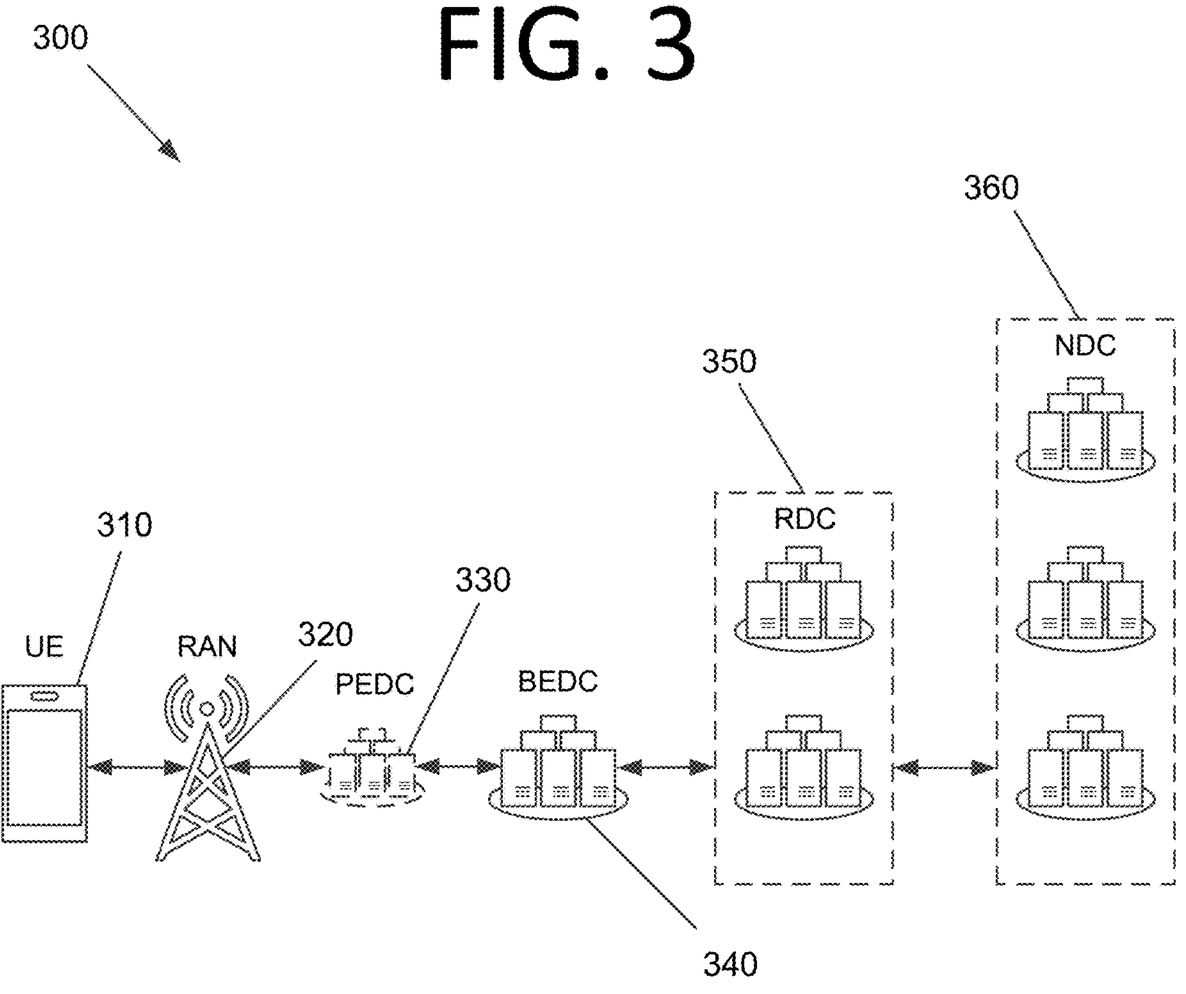
FIG. 3 is an architectural diagram illustrating a wireless telecommunications system, according to an embodiment of the present invention.

FIG. 3 is an architectural diagram illustrating a wireless telecommunications system 300, according to an embodiment of the present invention. User equipment (UE) 310 (e.g., a mobile phone, a tablet, a laptop computer, a smart watch, etc.) communicates with RAN 320. In some embodiments, RAN 320 may be a 5G New Radio O-RAN implementation where cell sites include antennas operably connected to Radio Units (RUs), which are operably connected to a Distributed Unit (DU), which, in turn, is operably connected to a Centralized Unit (CU).

RAN 320 sends communications to UE 310, as well as from UE 310 further into the carrier network. In some embodiments, communications are sent to/from RAN 320 via a PEDC 330 to provide lower latency. However, in some embodiments, RAN 320 communicates directly with a BEDC 340. In some embodiments, the DU and/or CU are located in RAN 320, PEDC 330, and/or BEDC 340. BEDCs are typically smaller data centers that are proximate to the populations they serve. BEDCs may break out User Plane Function data traffic (UPF-d) and provide cloud computing resources and cached content to UE 310, such as providing Network Function (NF) application services for gaming, enterprise applications, etc. In certain embodiments, RAN 320 may include a Local Data Center (LDC) (not shown) that hosts one or more Distributed Units (DUs) in a 5G Open RAN (O-RAN) architecture.

The carrier network may provide various NFs and other services. For instance, BEDC 340 may provide cloud computing resources and cached content to mobile device 310, such as providing NF application services for gaming, enterprise applications, etc. An RDC 350 may provide core network functions, such as UPF for voice traffic (UPF-v), UPF-d (if not in PEDC 330 or BEDC 340, for example), Session Management Function (SMF), and Access and Mobility Management Function (AMF) functionality. The SMF includes Packet Data Network Gateway (PGW) Control Plane (PGW-C) functionality. The UPF includes PGW User Data Plane (PGW-U) functionality.

An NDC 360 may provide a Unified Data Repository (UDR) and user verification services, for example. Other network services that may be provided may include, but are not limited to, Short Message Service Function (SMSF), Internet Protocol (IP) Multimedia Subsystem (IMS)+Telephone Answering Service (TAS), IP-SM Gateway (IP-SM-GW) (the network functionality that provides the messaging service in the IMS network), Enhanced Serving Mobile Location Center (E-SMLC), Home Subscriber Server (HSS), HSS+unified data management (UDM), Short Message Service Center (SMSC), and/or Policy Control Function (PCF) functionality. It should be noted that additional and/or different network functionality may be provided without deviating from the present invention. The various functions in these systems may be performed using dockerized clusters in some embodiments.

BEDC 340 may utilize other data centers for NF authentication services. This helps with managing user traffic latency, for instance. However, RDC 350 may not perform NF authentication in some embodiments.

From RDC 350, NF authentication requests may be sent to NDC 360, which may be located far away from UE 310, RAN 320, PEDC 330, BEDC 340, and RDC 350. NDC 360 may provide a UDR, and user verification may be performed at NDC 360. In some embodiments, mobile device 310 and/or computing systems of RAN 320, PEDC 330, BEDC 340, RDC 350, and/or NDC 360 may be computing system 1300 of FIG. 13.

It should be noted that wireless telecommunications system 300 of FIG. 3 is only one of multiple possible network configurations. For instance, if a cell site of RAN 320 is located in the same city as RDC 350, RAN 320 may connect directly to RDC 350. Any suitable network configuration may be used without deviating from the scope of the invention.

Figure 4:
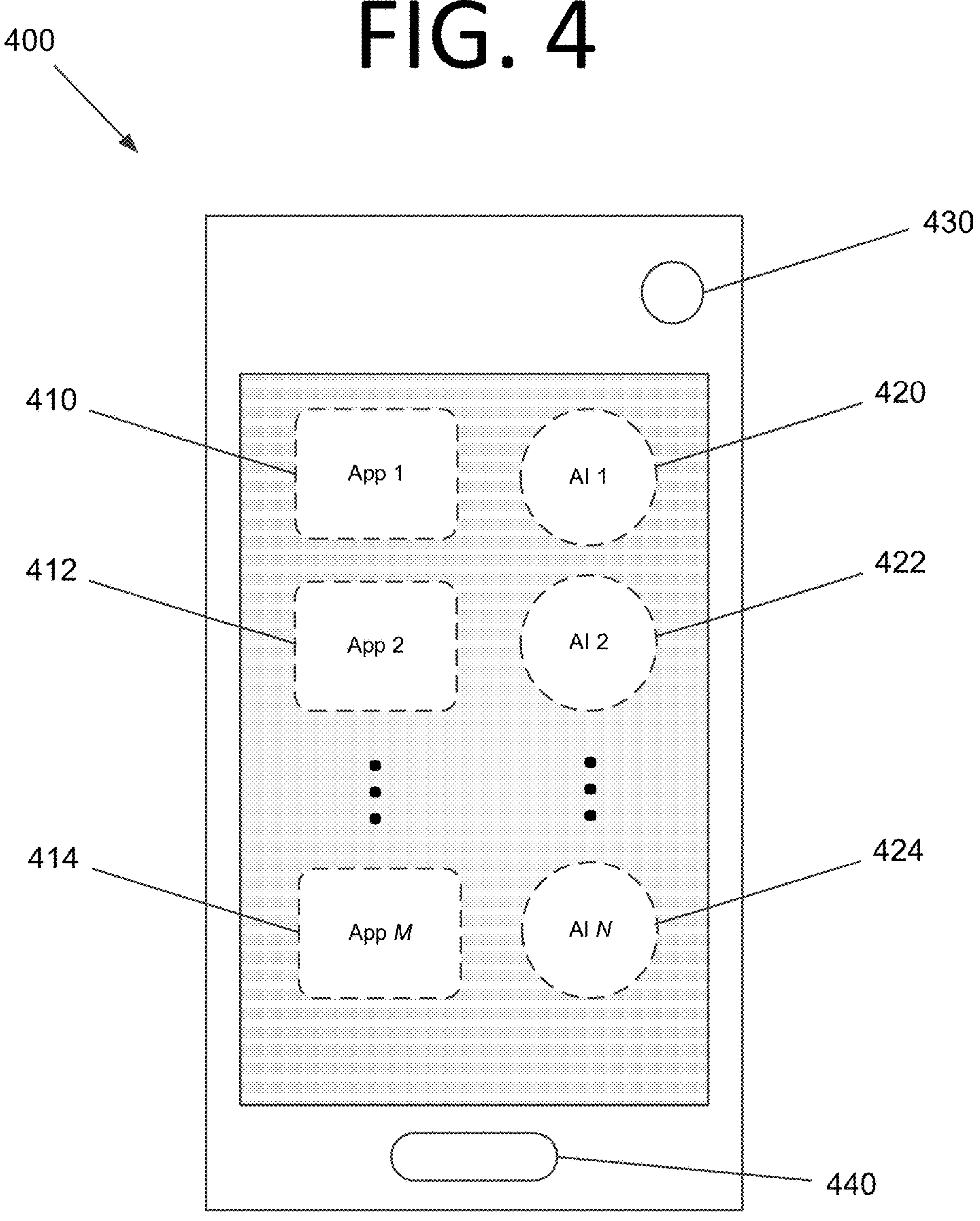
FIG. 4 illustrates a mobile device with multiple applications and AI/ML models, according to an embodiment of the present invention.

FIG. 4 illustrates a mobile device 400 with multiple applications and AI/ML models, according to an embodiment of the present invention. In some embodiments, mobile device 400 may be mobile device 110, 170, 172, or 174 of FIG. 1, mobile device 290 of FIG. 2, and/or computing system 1300 of FIG. 13. Mobile device 400 has M applications in this embodiment (i.e., application 1 410, application 2 412, . . . , application M 414). Mobile device 400 also has N AI/ML models in this embodiment (i.e., AI/ML model 1 420, AI/ML model 2 422, . . . , AI/ML model N 424). Applications 410, 412, . . . , 414 may provide the functionality described above, such as packet sniffing, detecting emergency calls, detecting that mobile device 400 has moved at an unexpected speed and/or to an unexpected or impermissible area, detecting signs of distress in text, voice recordings, video, and/or photos, sending OTT messages through a foreign carrier network, etc. Video and audio are captured by a camera 430 and microphone 440, respectively.

Figure 5:
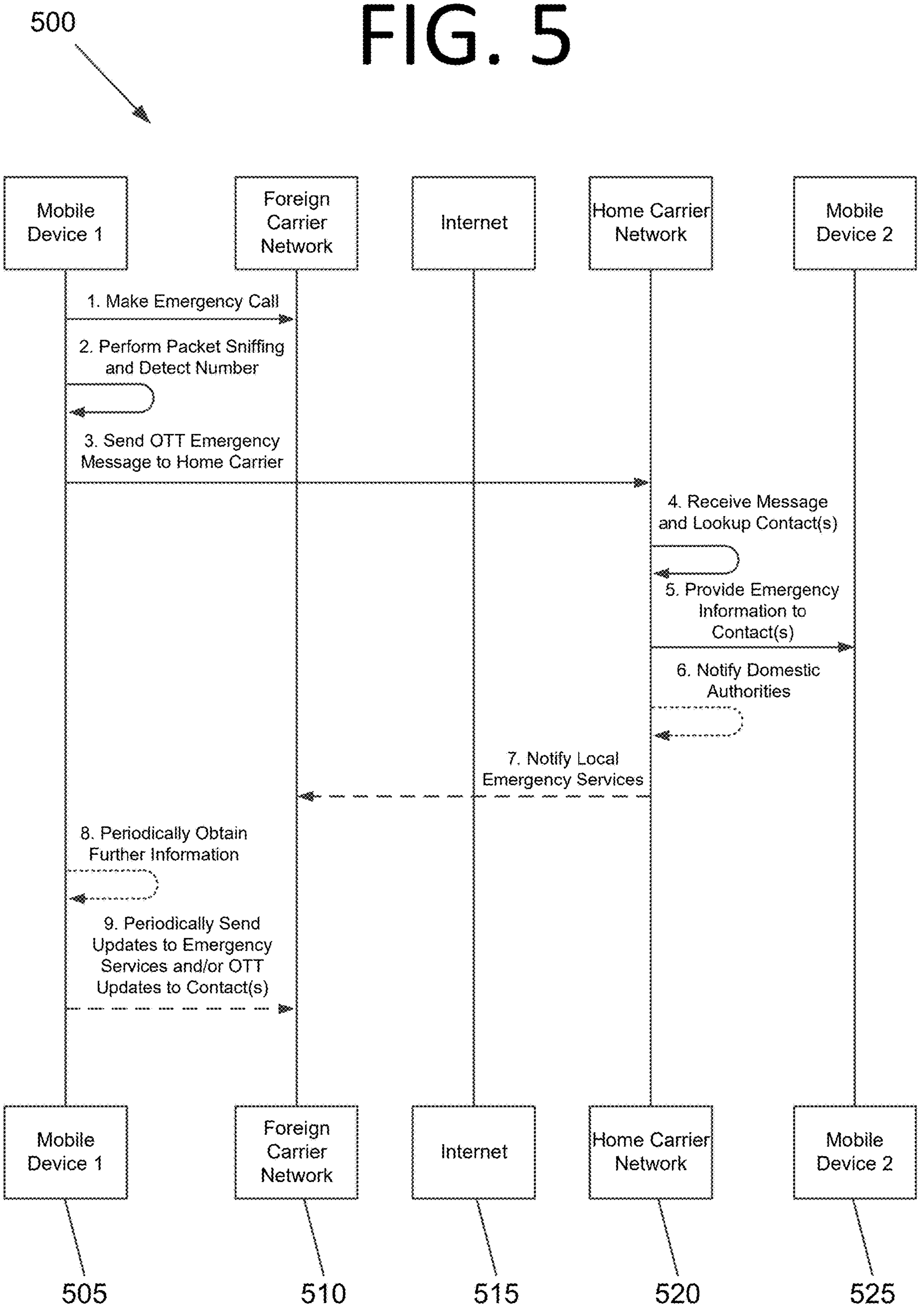
FIG. 5 is a flow diagram illustrating a process for performing foreign emergency notification, according to an embodiment of the present invention.

FIG. 5 is a flow diagram illustrating a process 500 for performing foreign emergency notification, according to an embodiment of the present invention. A first mobile device 505 places an emergency call over a foreign carrier network 510. An application running on first mobile device 505 performs packet sniffing and detects the emergency number in a packet header associated with the outgoing call and sends an OTT emergency message with a high priority (e.g., a high QCI) via a foreign carrier network 510 and on to home carrier network 520 via the Internet 515. An application running on server(s) of home carrier network 520 receives the emergency message and looks up contact(s) for emergency communications. The application of home carrier network 520 then provides emergency information to a second mobile device 525 of an emergency contact. For instance, the application may place a phone call, send a text message, send a voicemail message, and/or send a message via a third party application (e.g., via WhatsApp®, Signal®, Facebook Messenger®, etc.) to second mobile device 525.

In some embodiments, the application of home carrier network 520 takes further actions, such as notifying domestic authorities and/or notifying emergency services in the foreign country where first mobile device 505 is located via foreign carrier network 510 and/or the Internet 515. In the latter case, the application of first mobile device 505 may periodically obtain further information, such as providing audio and/or video recordings captured by first mobile device 505, to foreign carrier network 510 or the Internet 515, and on to the foreign emergency services and/or to emergency contacts via OTT messaging. It should be noted that the messages sent from home carrier network 520 and foreign carrier network 510 to computing systems of the domestic authorities and the foreign emergency services, respectively, are not shown.

Figure 6:
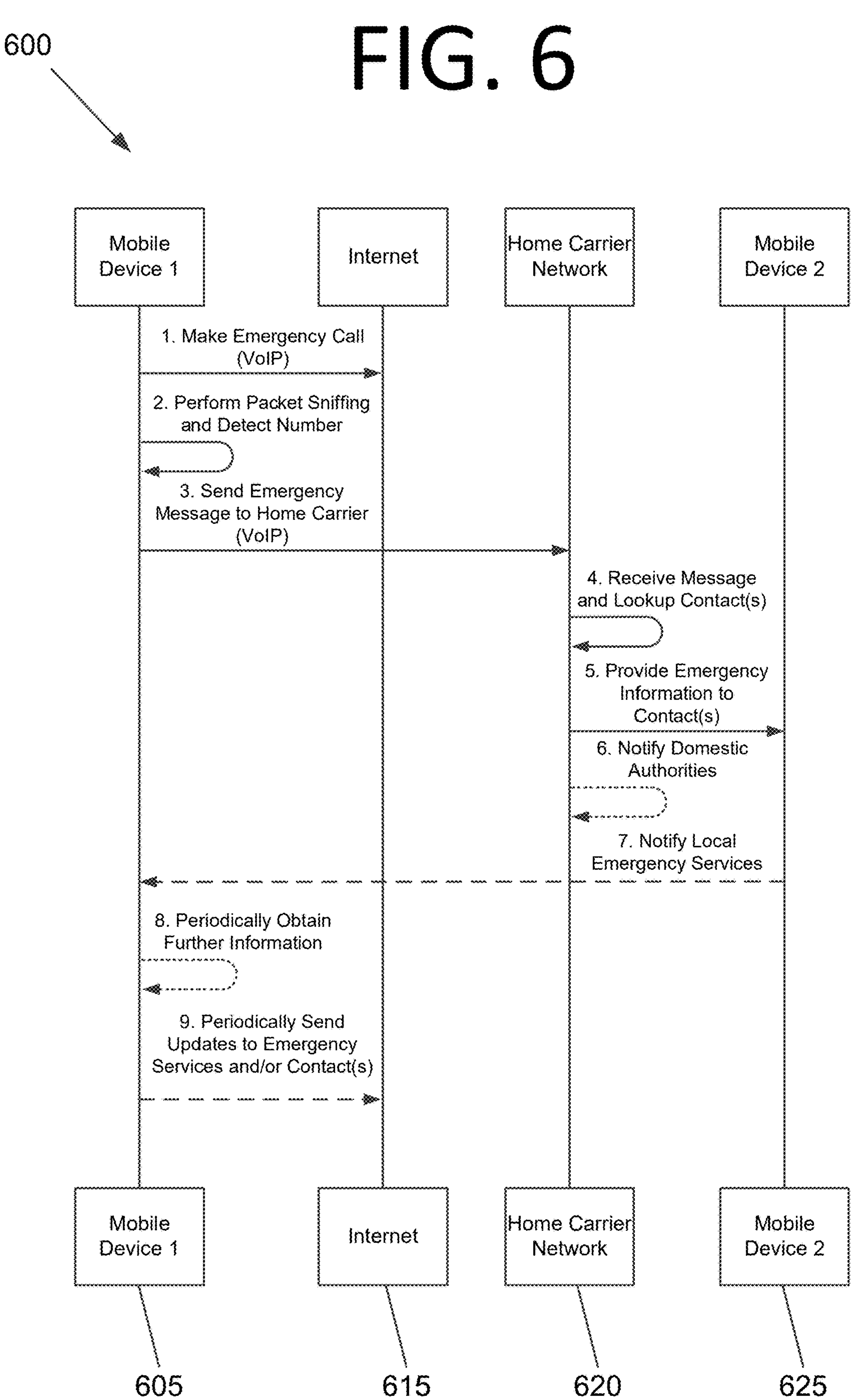
FIG. 6 is a flow diagram illustrating a process for performing foreign emergency notification using Voice over Internet Protocol (VOIP), according to an embodiment of the present invention.

FIG. 6 is a flow diagram illustrating a process 600 for performing foreign emergency notification using VoIP, according to an embodiment of the present invention. As with process 500 of FIG. 5, a first mobile device 605, the Internet 615, a home carrier network 620, and a second mobile device 625 are used. However, in FIG. 6, first mobile device 605 is only communicating via the Internet 615 using VoIP. For instance, first mobile device 605 may be in airplane mode, a foreign carrier network may be unavailable, or the user of first mobile device 605 may not wish to pay for roaming service on a foreign carrier network. In some embodiments, a stationary computing system, such as a desktop computer, may be used in place of first mobile device 605, but otherwise with similar functionality. Process 600 is otherwise similar to process 500 of FIG. 5.

Figure 7:
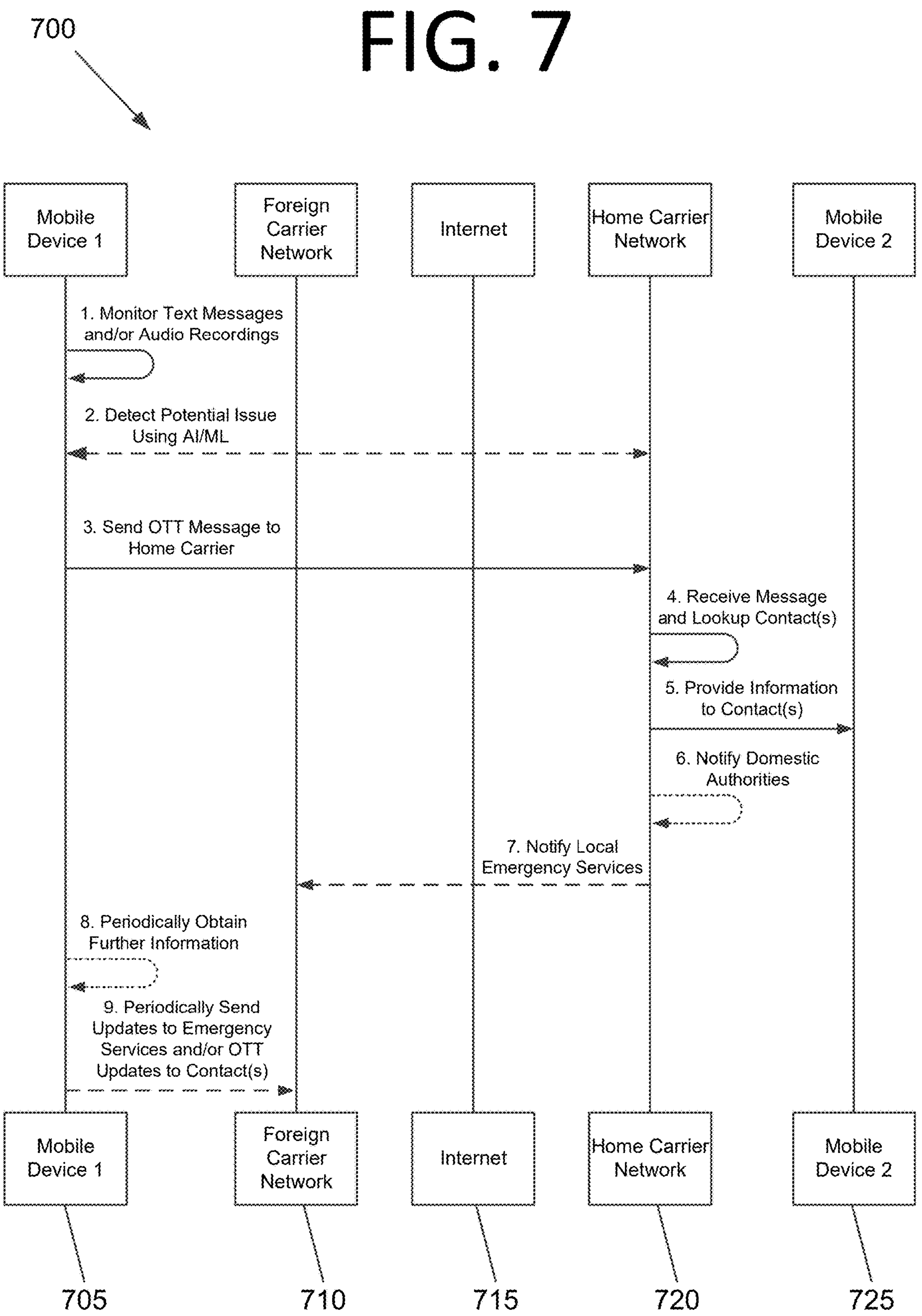
FIG. 7 is a flow diagram illustrating a process for performing foreign notification using AI/ML, according to an embodiment of the present invention.

FIG. 7 is a flow diagram illustrating a process 700 for performing foreign notification using AI/ML, according to an embodiment of the present invention. An application running on a first mobile device 705 monitors text messages and/or audio from a microphone. This may be done using AI/ML model(s) that are stored on mobile device 705 and/or on servers of a home carrier network 720. The application uses the output from the AI/ML model(s) to detect potential issues. For instance, the application and AI/ML model(s) may determine from the tone of the user's voice, the volume and patterns of the user's speech, the content of the user's speech, any combination thereof, etc. that the user is potentially experiencing an issue or is engaged in unpermitted behavior.

The application then sends an OTT message with a high priority via a foreign carrier network 710 and on to home carrier network 720 via the Internet 715. An application running on server(s) of home carrier network 720 receives the message and looks up contact(s) for communications associated with the application running on mobile device 705. The application of home carrier network 720 then provides information to a second mobile device 725 of an authorized contact. For instance, the application may place a phone call, send a text message, send a voicemail message, and/or send a message via a third party application to second mobile device 725.

In some embodiments, when an emergency may be occurring, the application of home carrier network 720 takes further actions, such as notifying domestic authorities and/or notifying emergency services in the foreign country where first mobile device 705 is located via foreign carrier network 710 and/or the Internet 715. In the latter case, the application of first mobile device 705 may periodically obtain further information, such as providing audio and/or video recordings captured by first mobile device 705, to foreign carrier network 710 or the Internet 715, and on to the foreign emergency services and/or to contacts via OTT messaging. It should be noted that the messages sent from home carrier network 720 and foreign carrier network 710 to computing systems of the domestic authorities and the foreign emergency services, respectively, are not shown.

Figure 8:
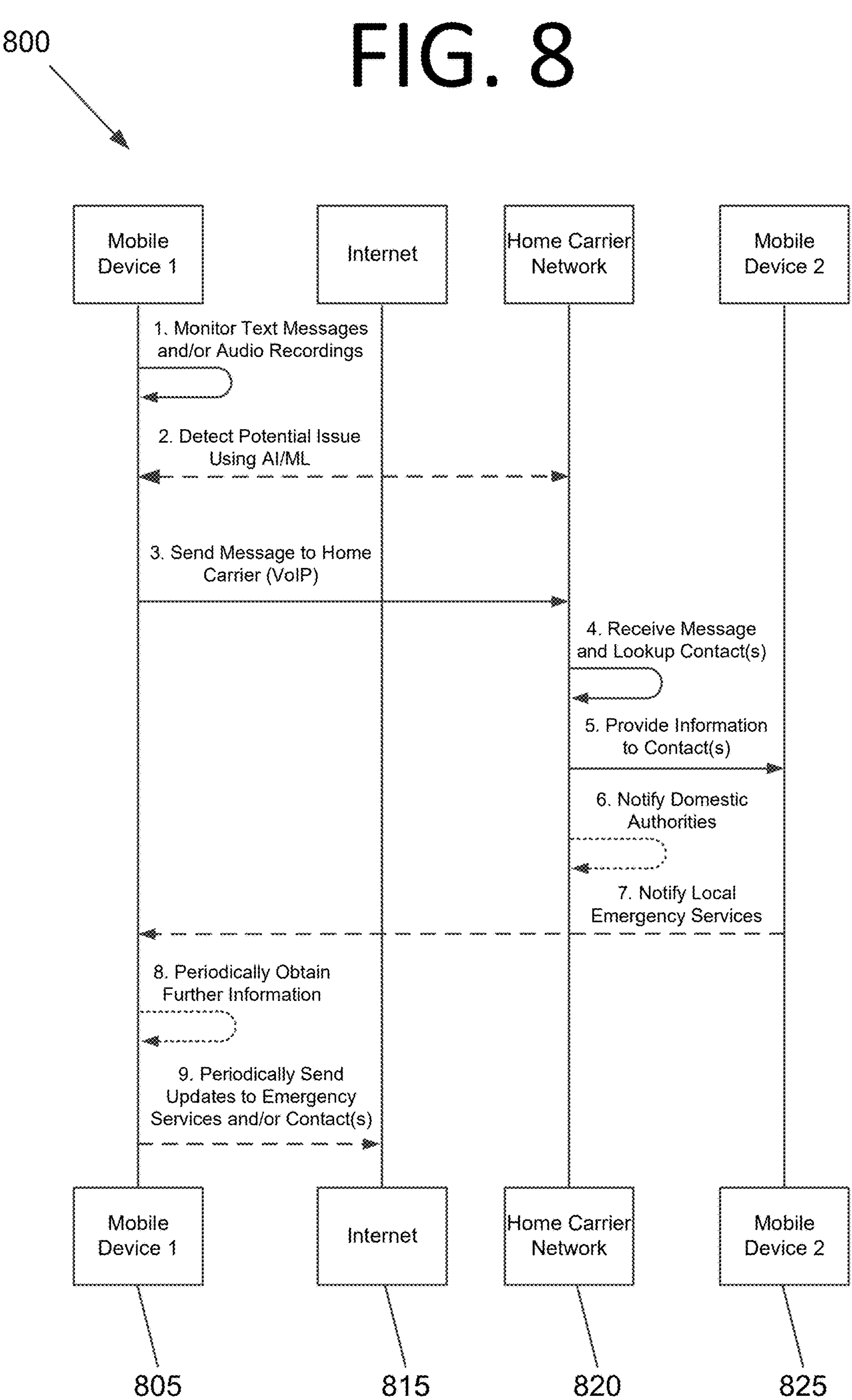
FIG. 8 is a flow diagram illustrating a process for performing foreign notification using AI/ML and VoIP, according to an embodiment of the present invention.

FIG. 8 is a flow diagram illustrating a process 800 for performing foreign notification using AI/ML and VoIP, according to an embodiment of the present invention. As with process 700 of FIG. 7, a first mobile device 805, the Internet 815, a home carrier network 820, and a second mobile device 825 are used. However, in FIG. 8, first mobile device 805 is only communicating via the Internet 815 using VoIP. For instance, first mobile device 805 may be in airplane mode, a foreign carrier network may be unavailable, or the user of first mobile device 805 may not wish to pay for roaming service on a foreign carrier network. In some embodiments, a stationary computing system, such as a desktop computer, may be used in place of first mobile device 805, but otherwise with similar functionality. Process 800 is otherwise similar to process 700 of FIG. 7.

Figure 9:
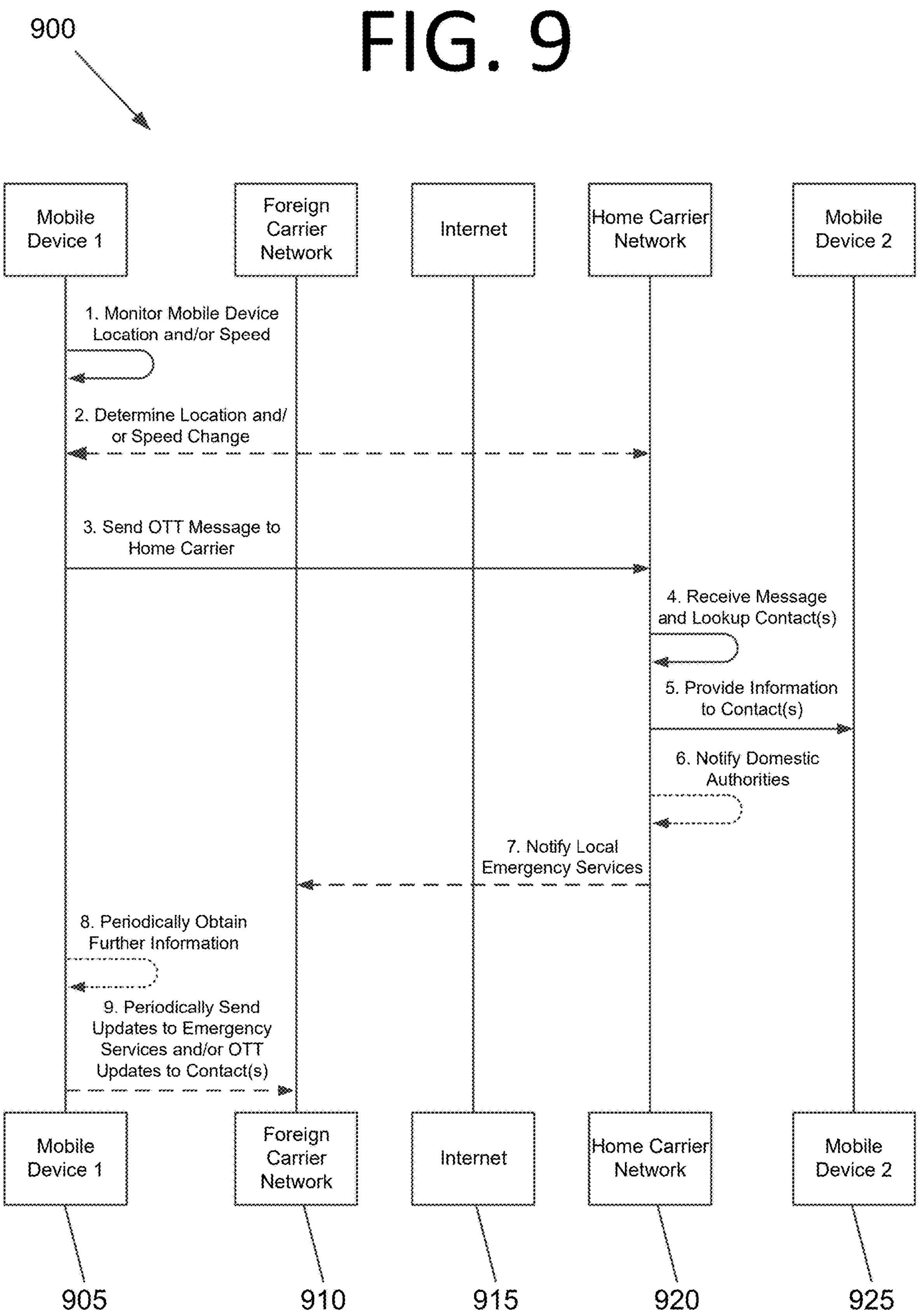
FIG. 9 is a flow diagram illustrating a process for monitoring mobile device movement, according to an embodiment of the present invention.

FIG. 9 is a flow diagram illustrating a process 900 for monitoring mobile device movement, according to an embodiment of the present invention. An application running on a first mobile device 905 monitors the location, acceleration, and/or speed of the mobile device. This may be performed using an IMU, GPS location tracking, cell tower triangulation, any combination thereof, etc. The application determines boundaries for locations in which the mobile device is permitted. For instance, an authorized user may set permitted boundaries for the user of first mobile device 905 (e.g., a certain permitted distance from a current location, a city, a certain region, a country, etc.). For instance, if a teenage child of the authorized user is on a class trip to Italy, the application may check whether first mobile device 905 stays in Italy. Alternatively, the application may track the location of the user and send updates to the authorized user when the location changes.

When an alert event is detected (e.g., first mobile device 905 moves outside of a permitted location, first mobile device 905 is turned off in a permitted location and turned on in an unpermitted location, first mobile device 905 moves above a permitted speed and/or along a path indicative of movement on a road, in a train, first mobile device 905 has changed location when location change updates are desired, etc.), first mobile device sends an OTT alert message with a high priority via a foreign carrier network 910 and on to home carrier network 920 via the Internet 915. An application running on server(s) of home carrier network 920 receives the alert message and looks up contact(s) for alert communications. The application of home carrier network 920 then provides emergency information to a second mobile device 925 of an authorized contact. For instance, the application may place a phone call, send a text message, send a voicemail message, and/or send a message via a third party application to second mobile device 925.

In some embodiments, when the location and/or speed change may be indicative of criminal activity, such as theft of the mobile device or a kidnapping, the application of home carrier network 920 takes further actions, such as notifying domestic authorities and/or notifying emergency services in the foreign country where first mobile device 905 is located via foreign carrier network 910 and/or the Internet 915. In the latter case, the application of first mobile device 905 may periodically obtain further information, such as providing audio and/or video recordings captured by first mobile device 905, to foreign carrier network 910 or the Internet 915, and on to the foreign emergency services and/or to contacts via OTT messaging. It should be noted that the messages sent from home carrier network 920 and foreign carrier network 910 to computing systems of the domestic authorities and the foreign emergency services, respectively, are not shown.

Figure 10:
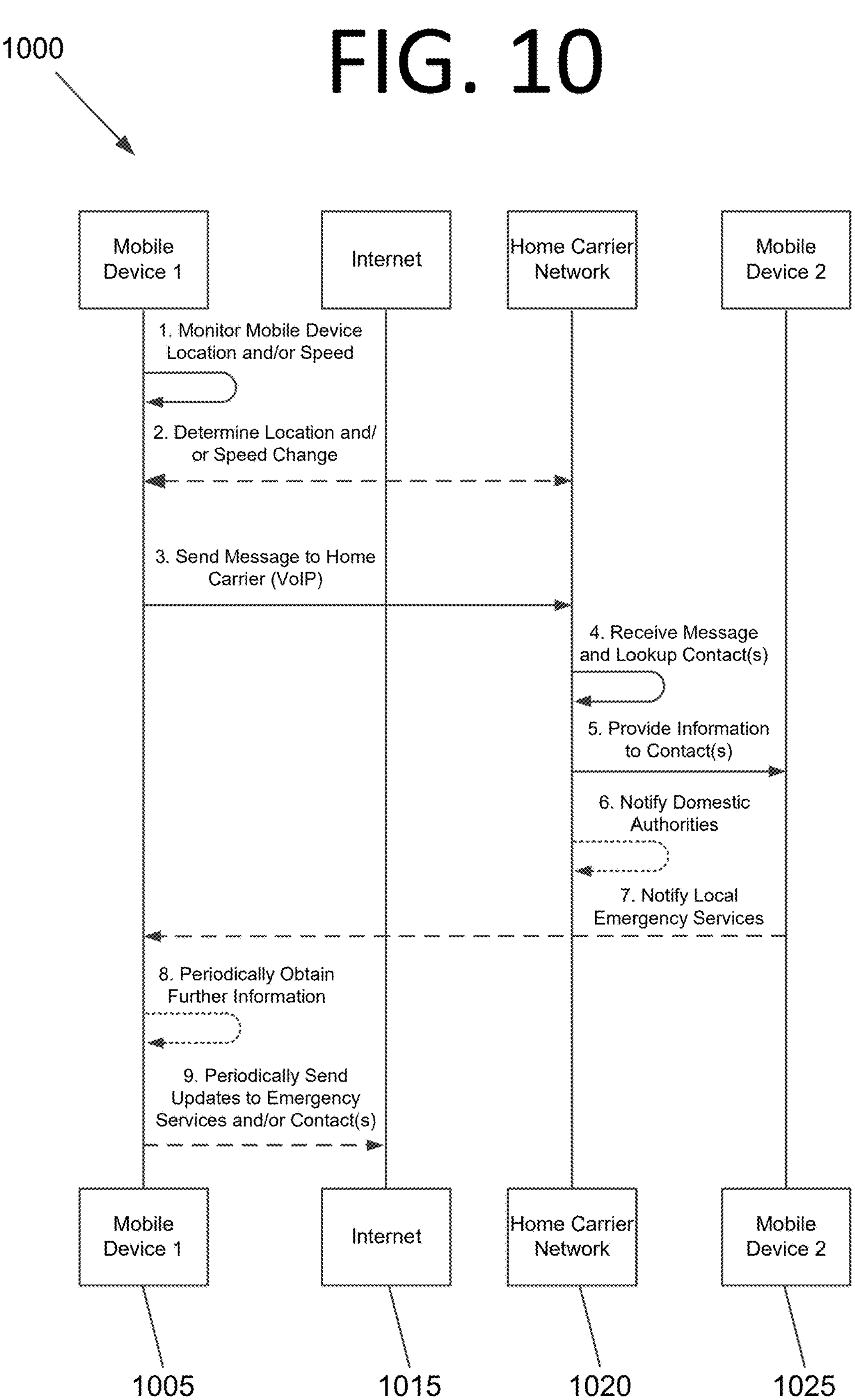
FIG. 10 is a flow diagram illustrating a process for monitoring mobile device movement using VoIP, according to an embodiment of the present invention.

FIG. 10 is a flow diagram illustrating a process 1000 for monitoring mobile device movement using VoIP, according to an embodiment of the present invention. As with process 900 of FIG. 9, a first mobile device 1005, the Internet 1015, a home carrier network 1020, and a second mobile device 1025 are used. However, in FIG. 10, first mobile device 1005 is only communicating via the Internet 1015 using VoIP. For instance, first mobile device 1005 may be in airplane mode, a foreign carrier network may be unavailable, or the user of first mobile device 1005 may not wish to pay for roaming service on a foreign carrier network. Process 1000 is otherwise similar to process 900 of FIG. 9.

Figure 11A:
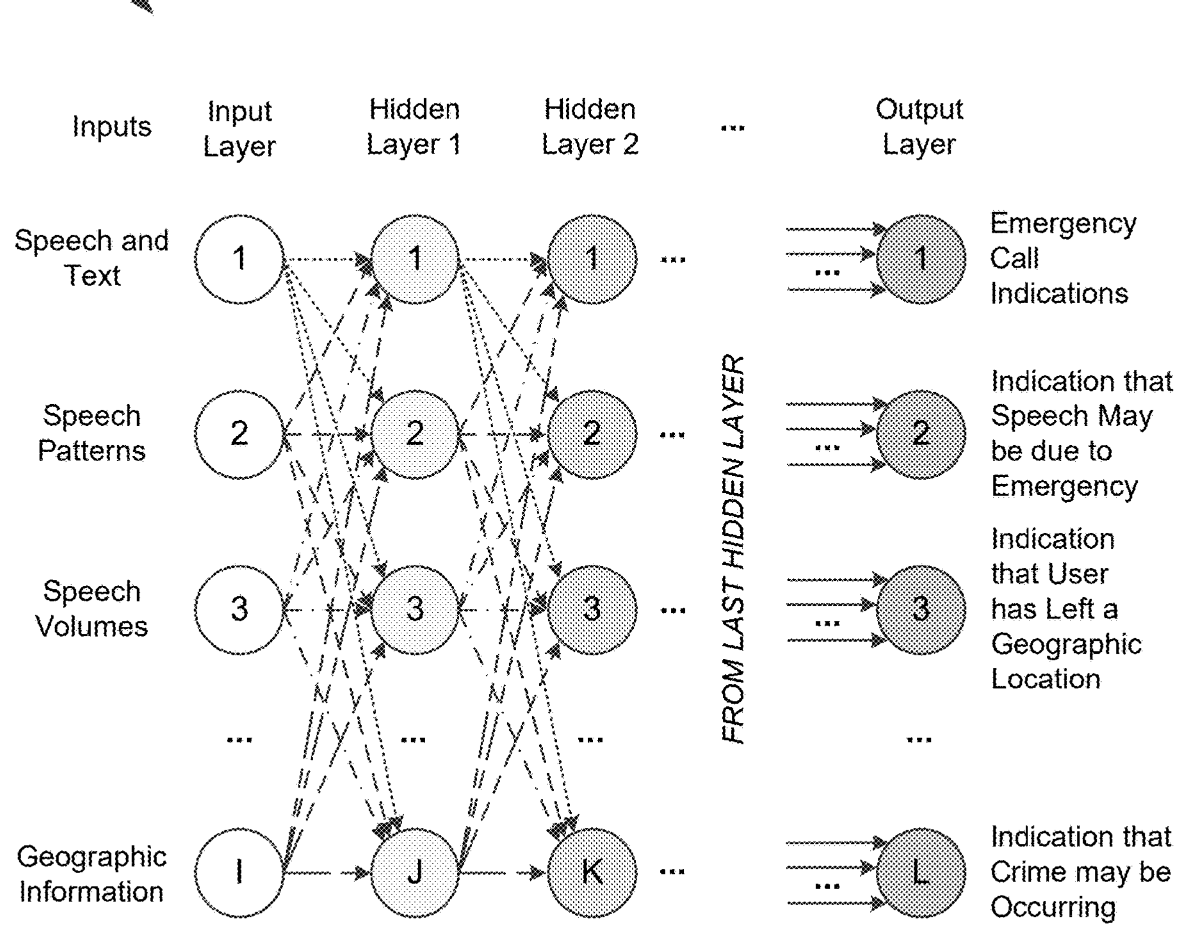
FIG. 11A illustrates an example of a neural network that has been trained to assist with tiered simultaneous core management, according to an embodiment of the present invention.

Per the above, AI/ML may be used in some embodiments. Various types of AI/ML models may be trained and deployed without deviating from the scope of the invention. For instance, FIG. 11A illustrates an example of a neural network 1100 that has been trained to assist with foreign emergency notification, activity notification, and suspicious movement detection for mobile devices, according to an embodiment of the present invention.

Neural network 1100 includes a number of hidden layers. Both deep learning neural networks (DLNNs) and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 1100.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 11A, speech and text, speech patterns, speech volumes (e.g., traces of decibel levels), geographic information (e.g., geographic coordinates of cities, regions, countries, roads, railways, etc.), etc. provided as the input layer are fed as inputs to the J neurons of hidden layer 1. While all of these inputs are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 1100 without deviating from the scope of the invention. Indeed, in certain embodiments, the types of neurons in a given layer may not all be the same. For instance, convolutional neurons, recurrent neurons, and/or transformer neurons may be used.

Neural network 1100 is trained to assign a confidence score to appropriate outputs. In order to reduce predictions that are inaccurate, only those results with a confidence score that meets or exceeds a confidence threshold may be provided in some embodiments. For instance, if the confidence threshold is 80%, outputs with confidence scores exceeding this amount may be used and the rest may be ignored.

It should be noted that neural networks are probabilistic constructs that typically have confidence score(s). This may be a score learned by the AI/ML model based on how often a similar input was correctly identified during training. Some common types of confidence scores include a decimal number between 0 and 1 (which can be interpreted as a confidence percentage as well), a number between negative ∞ and positive ∞, a set of expressions (e.g., "low," "medium," and "high"), etc. Various post-processing calibration techniques may also be employed in an attempt to obtain a more accurate confidence score, such as temperature scaling, batch normalization, weight decay, negative log likelihood (NLL), etc.

"Neurons" in a neural network are implemented algorithmically as mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 11B:
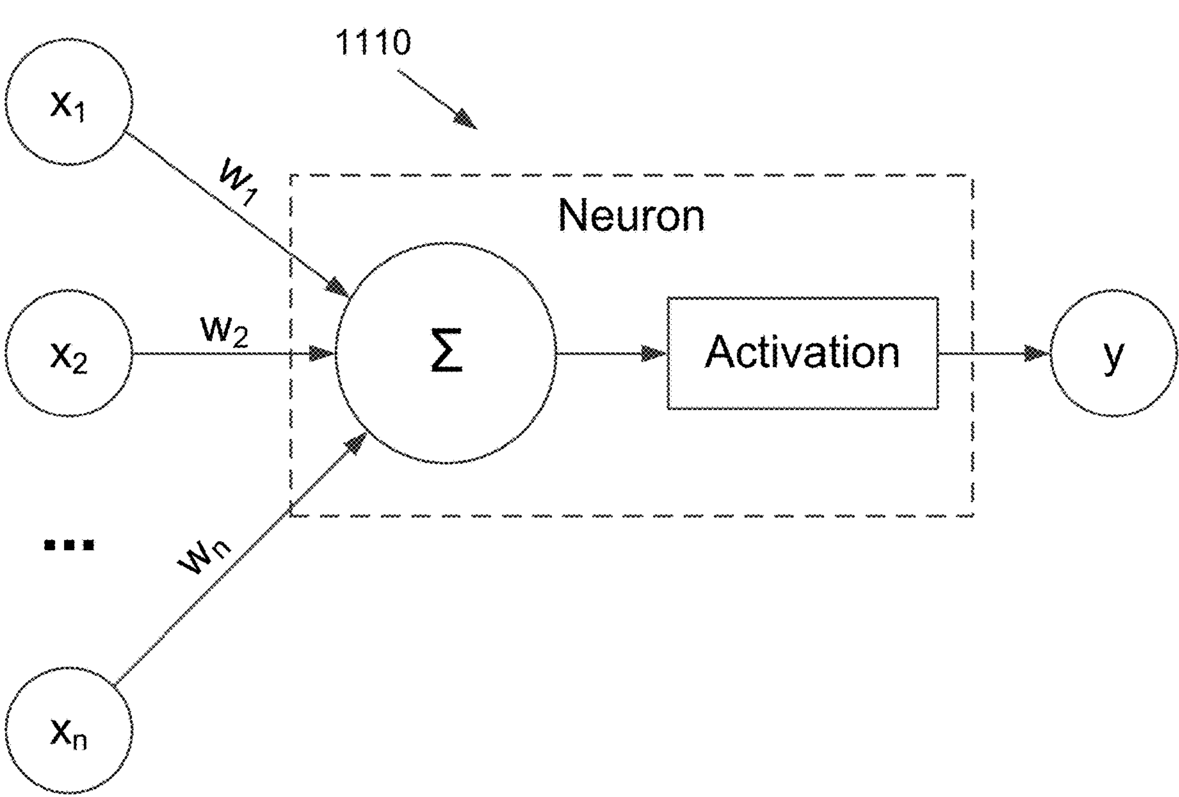
FIG. 11B illustrates an example of a neuron, according to an embodiment of the present invention.

An example of a neuron 1110 is shown in FIG. 11B. Inputs $x_1, x_2, \ldots, x_n$ from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 1110 may thus be given by:

$$y = f(x)\sum_{i=1}^{m}(w_i x_i) + \text{bias} \tag{3}$$

In this case, neuron 1110 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

A goal, or "reward function," is often employed. A reward function explores intermediate transitions and steps with both short-term and long-term rewards to guide the search of a state space and attempt to achieve a goal (e.g., finding the best core for a give service or application, determining when a network associated with a core is likely to be congested, etc.).

During training, various labeled data is fed through neural network 1100. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide corrections of incorrect predictions, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \tag{4}$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $$p_j(n_j) = f_j'(n_j),$$

where $n_j$ is the network activity at layer j (i.e., $n_j=W_j o_{j-1}+b_j$) where $o_j=f_j(n_j)$ and the apostrophe ' denotes the derivative of the activity function $f$. The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \tag{5}$$

$$\frac{\partial E}{\partial W_{j+1}} = d_{j+1}(o_j)^T \tag{6}$$

$$\frac{\partial E}{\partial b_{j+1}} = d_{j+1} \tag{7}$$

$$W_j^{new} = W_j^{old} - \eta \frac{\partial E}{\partial W_j} \tag{8}$$

$$b_j^{new} = b_j^{old} - \eta \frac{\partial E}{\partial b_j} \tag{9}$$

where $\circ$ denotes a Hadamard product (i.e., the element-wise product of two vectors), $^T$ denotes the matrix transpose, and $o_j$ denotes $f_j(W_j o_{j-1}+b_j)$, with $o_0=x$. Here, the learning rate n is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it performs well on the training data, but does not perform well on other data.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model. In certain embodiments, a collection of trained AI/ML models may be used to accomplish a task. This may collectively allow the AI/ML models to enable semantic understanding to better predict event-based congestion or service interruptions due to an accident, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Natural language processing (NLP) techniques such as word2vec, BERT, GPT-3, ChatGPT, etc. may be used in some embodiments to facilitate semantic understanding. Other techniques, such as clustering algorithms, may be used to find similarities between groups of elements. Clustering algorithms may include, but are not limited to, density-based algorithms, distribution-based algorithms, centroid-based algorithms, hierarchy-based algorithms. K-means clustering algorithms, the DBSCAN clustering algorithm, the Gaussian mixture model (GMM) algorithms, the balance iterative reducing and clustering using hierarchies (BIRCH) algorithm, etc. Such techniques may also assist with categorization.

Figure 12:
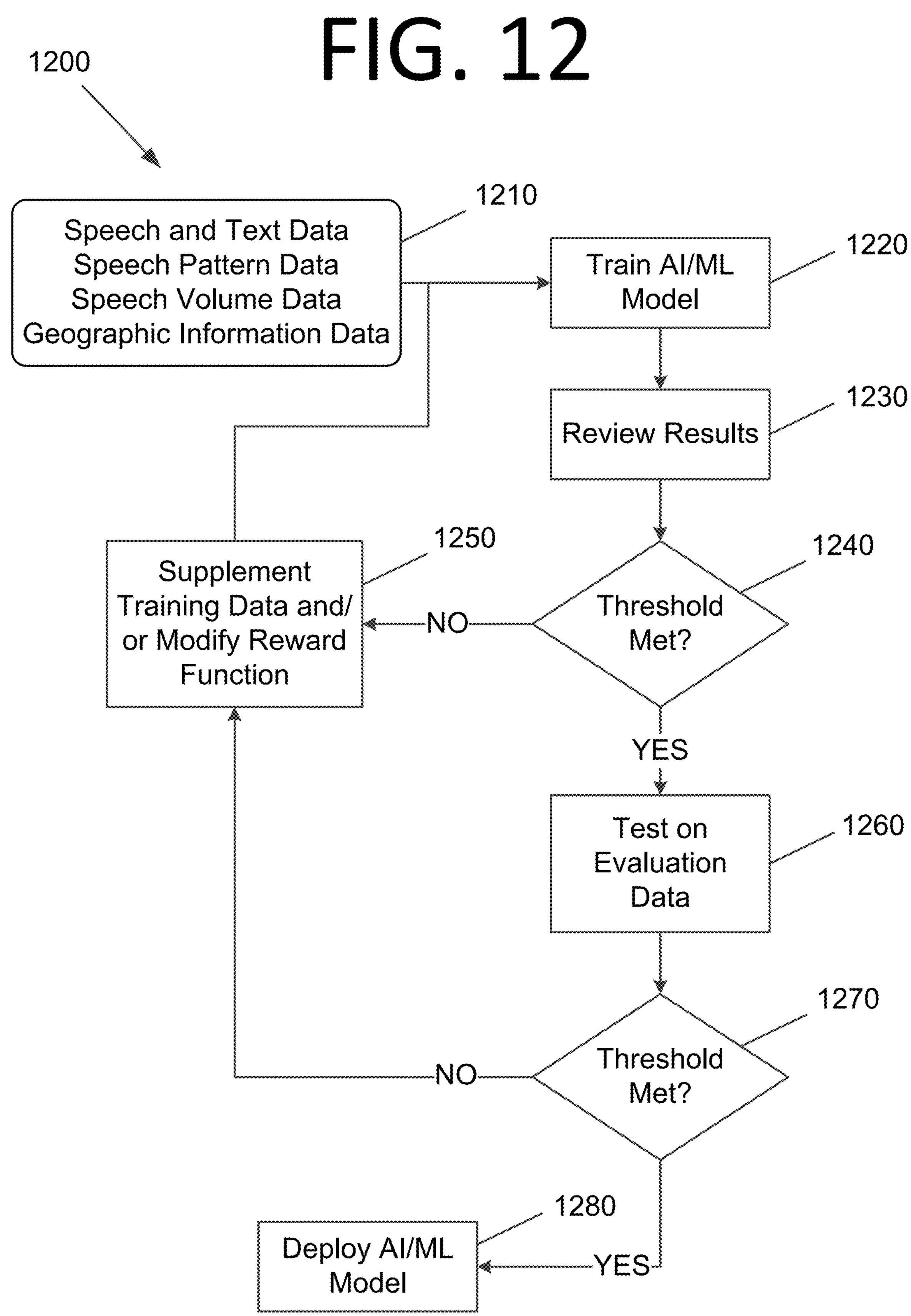
FIG. 12 is a flowchart illustrating a process for training AI/ML model(s), according to an embodiment of the present invention.

FIG. 12 is a flowchart illustrating a process 1200 for training AI/ML model(s), according to an embodiment of the present invention. The process begins with providing speech and text data, speech pattern data, speech volume data, geographic information data, etc. at 1210, whether labeled or unlabeled. Other training data used in addition to or in lieu of the training data shown in FIG. 12. Indeed, the nature of the training data that is provided will depend on the objective that the AI/ML model is intended to achieve. The AI/ML model is then trained over multiple epochs at 1220 and results are reviewed at 1230.

If the AI/ML model fails to meet a desired confidence threshold at 1240, the training data is supplemented and/or the reward function is modified to help the AI/ML model achieve its objectives better at 1250 and the process returns to step 1220. If the AI/ML model meets the confidence threshold at 1240, the AI/ML model is tested on evaluation data at 1260 to ensure that the AI/ML model generalizes well and that the AI/ML model is not over fit with respect to the training data. The evaluation data includes information that the AI/ML model has not processed before. If the confidence threshold is met at 1270 for the evaluation data, the AI/ML model is deployed at 1280. If not, the process returns to step 1250 and the AI/ML model is trained further.

FIG. 13 is an architectural diagram illustrating a computing system 1300 configured to perform operations for foreign emergency notification, activity notification, and/or suspicious movement detection for mobile devices, according to an embodiment of the present invention. In some embodiments, computing system 1300 may be one or more of the computing systems depicted and/or described herein, such as a mobile device, a tablet, a laptop computer, a smart watch, a foreign carrier network computing system, a home carrier network computing system (e.g., a computing system of a RAN, a PEDC, a BEDC, an RDC, or an NDC), etc. Computing system 1300 includes a bus 1305 or other communication mechanism for communicating information, and processor(s) 1310 coupled to bus 1305 for processing information. Processor(s) 1310 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1310 may also have multiple processing cores, and at least some of the cores may be configured to perform specific functions. Multi-parallel processing may be used in some embodiments. In certain embodiments, at least one of processor(s) 1310 may be a neuromorphic circuit that includes processing elements that mimic biological neurons. In some embodiments, neuromorphic circuits may not require the typical components of a Von Neumann computing architecture.

Computing system 1300 further includes a memory 1315 for storing information and instructions to be executed by processor(s) 1310. Memory 1315 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1310 and may include volatile media, non-volatile media, or both. The media may also be removable, non-removable, or both.

Additionally, computing system 1300 includes a communication device 1320, such as a transceiver, to provide access to a communications network via a wireless and/or wired connection. In some embodiments, communication device 1320 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 1320 may include one or more antennas that are singular, arrayed, phased, switched, beamforming, beamsteering, a combination thereof, and or any other antenna configuration without deviating from the scope of the invention.

Processor(s) 1310 are further coupled via bus 1305 to a display 1325, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 1325 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 1330 and a cursor control device 1335, such as a computer mouse, a touchpad, etc., are further coupled to bus 1305 to enable a user to interface with computing system 1300. However, in certain embodiments, a physical keyboard and mouse may not be present, and the user may interact with the device solely through display 1325 and/or a touchpad (not shown). Any type and combination of input devices may be used as a matter of design choice. In certain embodiments, no physical input device and/or display is present. For instance, the user may interact with computing system 1300 remotely via another computing system in communication therewith, or computing system 1300 may operate autonomously.

Memory 1315 stores software modules that provide functionality when executed by processor(s) 1310. The modules include an operating system 1340 for computing system 1300. The modules further include a detection and notification module 1345 that is configured to perform all or part of the processes described herein or derivatives thereof. Computing system 1300 may include one or more additional functional modules 1350 that include additional functionality.

One skilled in the art will appreciate that a "computing system" could be embodied as a server, an embedded computing system, a personal computer, a console, a personal digital assistant (PDA), a cell phone, a tablet computing device, a smart watch, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 14:
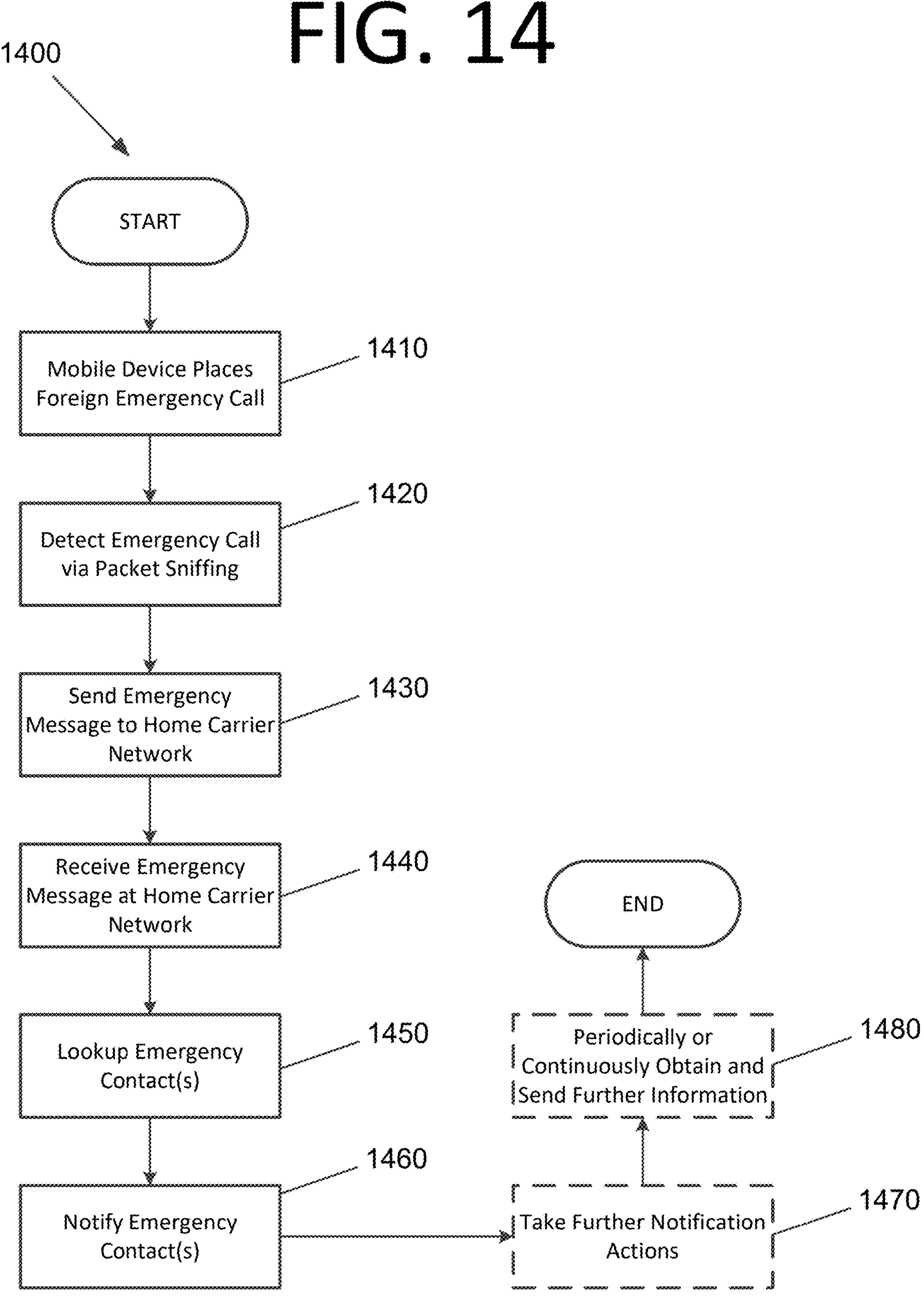
FIG. 14 is a flowchart illustrating a process for performing foreign emergency notification, according to an embodiment of the present invention.

FIG. 14 is a flowchart illustrating a process 1400 for performing foreign emergency notification, according to an embodiment of the present invention. The process begins with a mobile device in a foreign country placing an emergency call over a foreign carrier network or over the Internet via VoIP at 1410. An application running on the mobile device performs packet sniffing and detects the emergency number in a packet header associated with the outgoing call at 1420 and sends an emergency message to a home carrier network with a high priority at 1430 (e.g., via OTT messaging on the foreign carrier network or via the Internet alone). This high priority may be established by setting the QCI to the highest priority for the specific service type, as discussed above.

An application running on server(s) of the home carrier network receives the emergency message at 1440 and looks up contact(s) for emergency communications at 1450. The application of the home carrier network then notifies the emergency contact(s) at 1460 by providing emergency information to mobile device(s) of the emergency contact(s). For instance, the application may place a phone call, send a text message, send a voicemail message, and/or send a message via a third party application to these mobile device(s). In some embodiments, the emergency information is sent with a high priority so that the emergency notification(s) are not dropped by carrier network(s) and/or one or more ISP(s) serving the mobile device(s) of the emergency notification contact(s) due to congestion. In some embodiments, the emergency information may include a recording of a telephone call associated with a foreign emergency number call and/or text messages associated with the emergency from the mobile device in the foreign country.

In some embodiments, the application of the home carrier network takes further notification actions at 1470, such as notifying domestic authorities and/or notifying emergency services in the foreign country where the mobile device is located. In certain embodiments, the mobile device periodically or continuously obtains and sends further information at 1480 to the emergency contact(s) and/or additional notified parties, such as providing audio and/or video recordings captured by the mobile device, health metrics from applications such as Apple® Health, a notification that accelerometer data from the mobile device indicates a collision or a fall, etc.

Figure 15:
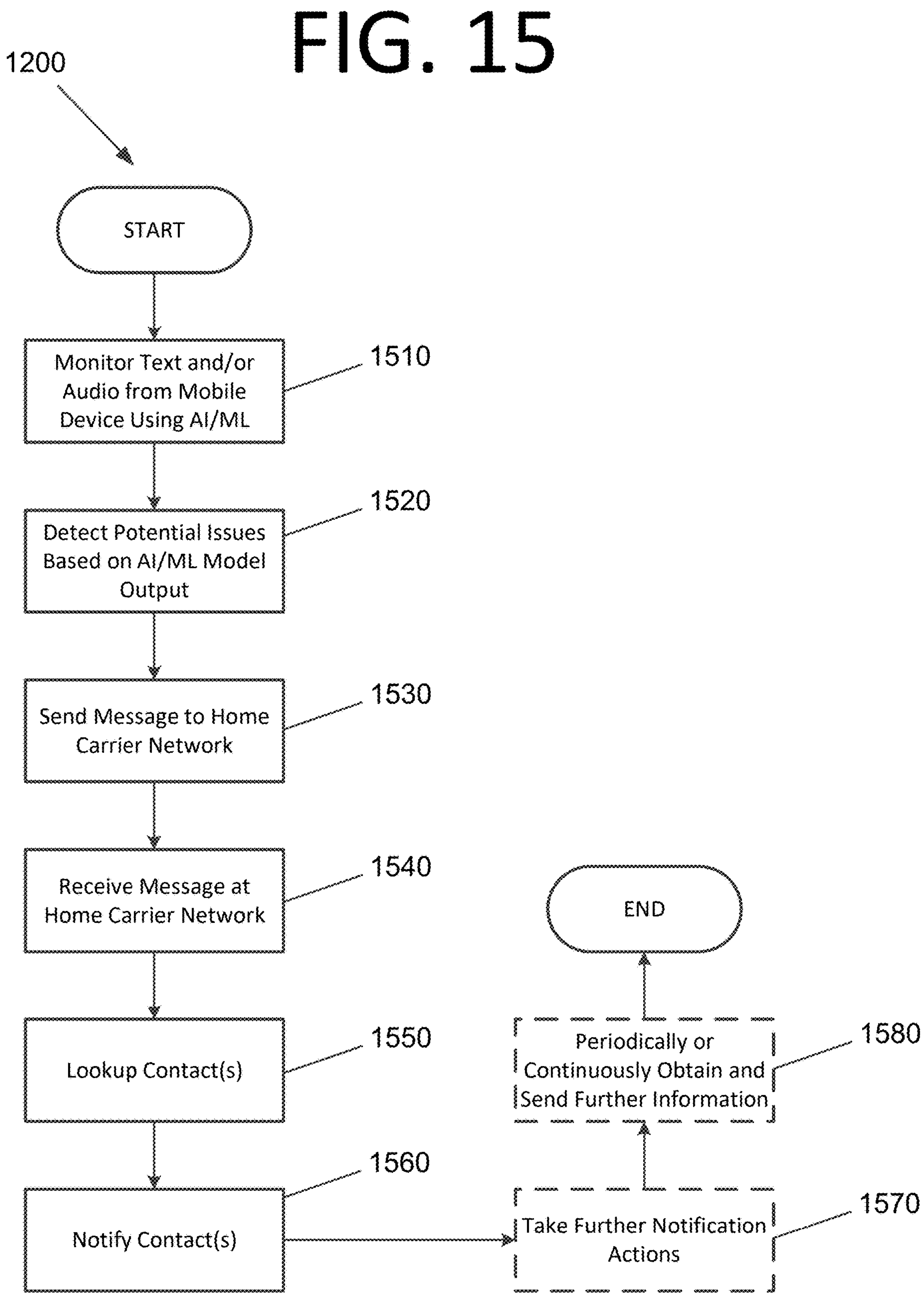
FIG. 15 is a flowchart illustrating a process for performing notification using AI/ML, according to an embodiment of the present invention.

FIG. 15 is a flowchart illustrating a process 1500 for performing notification using AI/ML, according to an embodiment of the present invention. The process begins with an application running on a mobile device monitoring text messages and/or audio from a microphone at 1510. The mobile device may be in the user's home country or a foreign country, depending on the purpose of the monitoring by the application. This may be done using AI/ML model(s) that are stored on the mobile device and/or on servers of a home carrier network that can be called by the application (i.e., the application provides the AI/ML models with a request including input and receives output from the AI/ML model(s) based on the input). The application uses the output from the AI/ML model(s) to detect potential issues at 1520. For instance, the application and/or AI/ML model(s) may be trained to determine from the tone of the user's voice, the volume and patterns of the user's speech, the content of the user's speech, any combination thereof, etc. that the user is potentially experiencing an issue or is engaged in unpermitted behavior.

The application of the mobile device then sends a message to a home carrier network with a high priority at 1530 (e.g., via OTT data messaging on the foreign carrier network or via the Internet alone (e.g., via an ISP). An application running on server(s) of the home carrier network receives the message at 1540 and looks up contact(s) for notifications at 1550. The application of the home carrier network then notifies the contact(s) at 1560 by providing information to mobile device(s) of the contact(s). For instance, the application may place a phone call, send a text message, send a voicemail message, and/or send a message via a third party application to these mobile device(s).

In some embodiments, when an emergency may be occurring, the application of the home carrier network takes further notification actions at 1570, such as notifying domestic authorities and/or notifying emergency services in the foreign country where the mobile device is located. In certain embodiments, the mobile device periodically or continuously obtains and sends further information at 1580 to the contact(s) and/or additional notified parties, such as providing audio and/or video recordings captured by the mobile device, health metrics from applications such as Apple® Health, a notification that accelerometer data from the mobile device indicates a collision or a fall.

Figure 16:
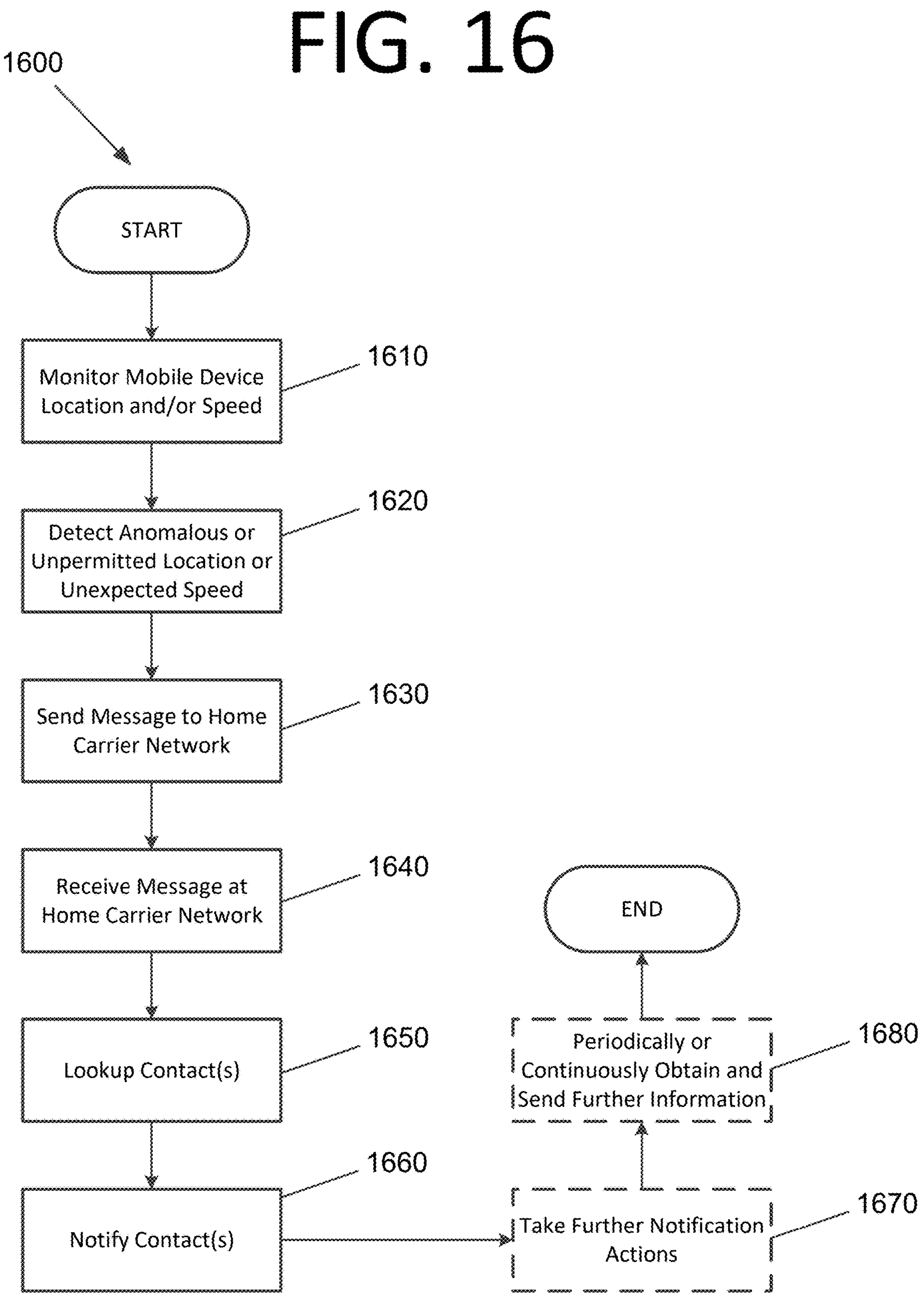
FIG. 16 is a flowchart illustrating a process for monitoring mobile device speed and/or movement, according to an embodiment of the present invention.

FIG. 16 is a flowchart illustrating a process 1600 for monitoring mobile device speed and/or movement, according to an embodiment of the present invention. The mobile device may be in the user's home country or a foreign country, depending on the purpose of the monitoring by the application. The process begins with an application running on a mobile device monitoring the location, acceleration, and/or speed of the mobile device at 1610. In some embodiments, this may be supplemented by AI/ML model(s) that are stored on the mobile device and/or on servers of a home carrier network that can be called by the application (i.e., the application provides the AI/ML models with a request including input and receives output from the AI/ML model(s) based on the input). The application detects that the location is anomalous or unpermitted and/or that the mobile device is moving at an unusual speed at 1620. For instance, the mobile device may have been tracked to or been turned on in another city, region, or country and/or the mobile device may be moving at a high rate of speed that is not expected, such as highway or rail line speeds. The location, acceleration, and/or movement may be determined using Bayesian probability, Monte Carlo simulations, other statistical and/or probabilistic methods, etc.

The application of the mobile device then sends a message regarding the anomalous movement to a home carrier network with a high priority at 1630 (e.g., via OTT messaging on the foreign carrier network or via the Internet alone). An application running on server(s) of the home carrier network receives the message at 1640 and looks up contact(s) for notifications at 1650. The application of the home carrier network then notifies the contact(s) at 1660 by providing information to mobile device(s) of the contact(s). For instance, the application may place a phone call, send a text message, send a voicemail message, and/or send a message via a third party application to these mobile device(s).

In some embodiments, when an emergency or crime may be occurring, such as a potential kidnapping or the theft of the mobile device, the application of the home carrier network takes further notification actions at 1670, such as notifying domestic authorities and/or notifying emergency services in the foreign country where the mobile device is located. In certain embodiments, the mobile device periodically or continuously obtains and sends further information at 1680 to the contact(s) and/or additional notified parties, such as providing audio and/or video recordings captured by the mobile device, providing real time location information for the mobile device, etc.

The process steps performed in FIGS. 5-10, 12, and 14-16 may be performed by computer program(s), encoding instructions for the processor(s) to perform at least part of the process(es) described in FIGS. 5-10, 12, and 14-16, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 1310 of computing system 1300 of FIG. 13) to implement all or part of the process steps described in FIGS. 5-10, 12, and 14-16, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. One or more computing systems, comprising:

memory storing computer program instructions; and at least one processor configured to execute the computer program instructions, wherein the computer program instructions are configured to cause the at least one processor to:

monitor a location, an acceleration, and/or a speed of a mobile device, provide information pertaining to the location, the acceleration, and/or the speed of the mobile device to one or more artificial intelligence (AI)/machine learning (ML) models as input, receive and analyze output from the one or more AI/ML models, detect, based on the analysis, that the location and/or movement of the mobile device is anomalous, and send a message pertaining to the anomalous location and/or movement of the mobile device via a roaming network or an Internet Service Provider (ISP) to a home wireless cellular network core.

2. The one or more computing systems of claim 1, wherein the message comprises a voice call with a recording, a voicemail message, a Short Message Service (SMS) message, an email, or any combination thereof.

3. The one or more computing systems of claim 1, wherein at least one of the one or more AI/ML models is trained to determine speeds, locations, and/or accelerations that are anomalous based on training data and provide the output based on the determination.

4. The one or more computing systems of claim 1, wherein the message is sent with a sufficiently high priority that packets associated with the message are not dropped by the roaming network, the home wireless cellular network core, and/or the ISP due to congestion.

5. The one or more computing systems of claim 4, wherein the high priority of the packets of the message is indicated by a Quality of Service (QOS) Class Identifier (QCI) of 1 for a voice call, 5 for a Short Message Service (SMS) message, or 6 for Internet Protocol (IP) voice calls or messages.

6. The one or more computing systems of claim 1, wherein at least one of the one or more AI/ML models is located on the mobile device or a computing system of the home wireless cellular network core.

7. The one or more computing systems of claim 1, wherein the one or more AI/ML models comprise at least two AI/ML models, at least one AI/ML model is located on the mobile device, and at least one other AI/ML model is located on a computing system of the home wireless cellular network core.

8. The one or more computing systems of claim 1, wherein the computer program instructions are further configured to cause the at least one processor to:

receive the message and determine from the communication that the location and/or movement of the mobile device is anomalous;

perform a lookup of one or more contacts for the user of the mobile device; and send one or more notifications to respective mobile devices of the one or more contacts indicating that the location and/or movement of the mobile device is anomalous.

9. The one or more computing systems of claim 8, wherein the one or more notifications comprise a voice call with a recording, a voicemail message, a Short Message Service (SMS) message, a communication via a third party application running on the respective mobile devices of the one or more contacts, or any combination thereof.

10. The one or more computing systems of claim 1, wherein the computer program instructions are configured to cause the at least one processor to:

send one or more additional notifications to domestic and/or international authorities pertaining to the anomalous location and/or movement of the mobile device.

11. One or more non-transitory computer-readable media storing computer program instructions, wherein the computer program instructions are configured to cause at least one processor to:
monitor a location, an acceleration, and/or a speed of a mobile device,
provide information pertaining to the location, the acceleration, and/or the speed of the mobile device to one or more artificial intelligence (AI)/machine learning (ML) models as input,
receive and analyze output from the one or more AI/ML models,
detect, based on the analysis, that the location and/or movement of the mobile device is anomalous, and
send a message pertaining to the anomalous location and/or movement of the mobile device via a roaming network or an Internet Service Provider (ISP) to a home wireless cellular network core, wherein
at least one of the one or more AI/ML models is trained to determine speeds, locations, and/or accelerations that are anomalous based on training data and provide the output based on the determination.

12. The one or more non-transitory computer-readable media of claim 11, wherein the message comprises a voice call with a recording, a voicemail message, a Short Message Service (SMS) message, an email, or any combination thereof.

13. The one or more non-transitory computer-readable media of claim 11, wherein the message is sent with a sufficiently high priority that packets associated with the message are not dropped by the roaming network, the home wireless cellular network core, and/or the ISP due to congestion.

14. The one or more non-transitory computer-readable media of claim 13, wherein the high priority of the packets of the message is indicated by a Quality of Service (QOS) Class Identifier (QCI) of 1 for a voice call, 5 for a Short Message Service (SMS) message, or 6 for Internet Protocol (IP) voice calls or messages.

15. The one or more non-transitory computer-readable media of claim 11, wherein at least one of the one or more AI/ML models is located on the mobile device or a computing system of the home wireless cellular network core.

16. The one or more non-transitory computer-readable media of claim 11, wherein
the one or more AI/ML models comprise at least two AI/ML models,
at least one AI/ML model is located on the mobile device, and
at least one other AI/ML model is located on a computing system of the home wireless cellular network core.

17. A mobile device, comprising:
memory storing computer program instructions; and
at least one processor configured to execute the computer program instructions, wherein the computer program instructions are configured to cause the at least one processor to:
monitor text messages sent and/or received by a mobile device, audio recorded by a microphone of the mobile device, or both,
provide the text messages and/or recorded audio to one or more artificial intelligence (AI)/machine learning (ML) models as input,
receive and analyze output from the one or more AI/ML models,
detect, based on the analysis, that a user of the mobile device is potentially experiencing an issue or is engaged in unpermitted behavior, and
send a message pertaining to the potential issue or the unpermitted behavior via a roaming network or an Internet Service Provider (ISP) to a home wireless cellular network core, wherein
at least one of the one or more AI/ML models is trained to determine speeds, locations, and/or accelerations that are anomalous based on training data and provide the output based on the determination, and
the message is sent with a sufficiently high priority that packets associated with the message are not dropped by the roaming network, the home wireless cellular network core, and/or the ISP due to congestion.

18. The mobile device of claim 17, wherein the message comprises a voice call with a recording, a voicemail message, a Short Message Service (SMS) message, an email, or any combination thereof.

19. The mobile device of claim 17, wherein the high priority of the packets of the message is indicated by a Quality of Service (QOS) Class Identifier (QCI) of 1 for a voice call, 5 for a Short Message Service (SMS) message, or 6 for Internet Protocol (IP) voice calls or messages.

20. The mobile device of claim 17, wherein at least one of the one or more AI/ML models is located on the mobile device.

* * * * *